United States Patent
Kho et al.

(10) Patent No.: US 10,664,635 B2
(45) Date of Patent: May 26, 2020

(54) DETERMINING NON-LINEAR PETROFACIES USING CROSS-PLOT PARTITIONING

(71) Applicant: LANDMARK GRAPHICS CORPORATION, Houston, TX (US)

(72) Inventors: Timothy Jeremiah Kho, Golden, CO (US); Travis St. George Ramsay, Hockely, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 520 days.

(21) Appl. No.: 15/533,947

(22) PCT Filed: Dec. 8, 2014

(86) PCT No.: PCT/US2014/069114
§ 371 (c)(1),
(2) Date: Jun. 7, 2017

(87) PCT Pub. No.: WO2016/093793
PCT Pub. Date: Jun. 16, 2016

(65) Prior Publication Data
US 2017/0323036 A1    Nov. 9, 2017

(51) Int. Cl.
*G06F 30/20* (2020.01)
*G01V 99/00* (2009.01)
*G06F 111/10* (2020.01)

(52) U.S. Cl.
CPC .......... *G06F 30/20* (2020.01); *G01V 99/005* (2013.01); *G06F 2111/10* (2020.01)

(58) Field of Classification Search
None
See application file for complete search history.

(56) References Cited

U.S. PATENT DOCUMENTS

| | | | | |
|---|---|---|---|---|
| 5,835,883 | A * | 11/1998 | Neff ................. | G01V 11/00 |
| | | | | 702/7 |
| 10,282,496 | B2 * | 5/2019 | Walsh .............. | E21B 47/00 |
| 2009/0259446 | A1 | 10/2009 | Zhang et al. | |
| 2012/0221306 | A1 | 8/2012 | Hurley et al. | |
| 2012/0312090 | A1 | 12/2012 | Klein et al. | |
| 2013/0325349 | A1 * | 12/2013 | Bunting ........... | G01V 11/00 |
| | | | | 702/11 |
| 2014/0149041 | A1 | 5/2014 | Sung et al. | |

FOREIGN PATENT DOCUMENTS

WO    2016093794 A1    6/2016

OTHER PUBLICATIONS

Moss, Brian P. "The partitioning of petrophysical data: a review", Developments in Petrophysics, Geological Society Special publication No. 122, pp. 181-252. (Year: 1997).*

French Search Report; French Application No. 1559631; dated Feb. 16, 2018.

(Continued)

*Primary Examiner* — Suzanne Lo
(74) *Attorney, Agent, or Firm* — Polsinelli PC

(57) ABSTRACT

Systems and methods for determining non-linear petrofacies using cross-plot partitioning to define petrofacies boundaries that distinguish the petrofacies by appearance and/or composition using systematic and automated data analysis techniques.

20 Claims, 18 Drawing Sheets

(56) References Cited

OTHER PUBLICATIONS

Nabikhani, N. et al., "The Evolution of Reservoir Quality of Sarvak Formation in One of Oil Fields of the Persian Gulf", Journal of Petroleum Science and Technology; vol. 2, No. 1, pp. 3-15; Jan. 1, 2012.

Abu Al-Atta, Mohamed, "Source Rock Evaluation and Organic Geochemistry of Belayim Marine Oil Field, Gulf of Suez, Egypt", Egyptian Journal of Petroleum, vol. 23, No. 3; pp. 285-302, Nov. 26, 2014.

International Search Report and Written Opinion; PCT Application No. PCT/US2014/069114; dated Aug. 19, 2015.

* cited by examiner

DETERMINING NON-LINEAR PETROFACIES USING CROSS-PLOT PARTITIONING

CROSS-REFERENCE TO RELATED APPLICATIONS

Not applicable. This application is a national stage entry of PCT/US2014/069114 filed Dec. 8, 2014, said application is expressly incorporated herein in its entirety.

STATEMENT REGARDING FEDERALLY SPONSORED RESEARCH

Not applicable.

FIELD OF THE DISCLOSURE

The present disclosure generally relates to systems and methods for determining non-linear petrofacies using cross-plot partitioning. More particularly, the present disclosure relates to determining non-linear petrofacies using cross-plot partitioning to define petrofacies boundaries that distinguish the petrofacies by appearance and/or composition using systematic and automated data analysis techniques.

BACKGROUND

The identification of rock types, also referred to as petrofacies, as a method of reservoir characterization is indispensable for accurate prediction of hydrocarbon production from subsurface reservoirs. Identifying petrofacies is an essential process for Pore to Core upscaling, which is a part of the combined reservoir characterization and predictive analysis (simulation) process. Pore to Core upscaling refers to the process of assigning petrophysical and hydraulic conductivity properties determined from pore scale measurements to a core, which would typically be used to describe subsurface rock types in the grid-cells of a reservoir simulation model. The petrofacies are used in conjunction with the disparate petrophysical and/or hydraulic properties to spatially characterize multiphase flow behavior in the cells of the 3D geocellular grid. Typically these petrofacies are derived using a priori derived seismic attribute, well log and core analysis data, which are analyzed on a cross-plot according to the disparate petrophysical and/or hydraulic properties. Standard practice is to plot relevant data points (e.g. permeability and porosity) in a cross-plot and define clusters of data using a linear relation. Not only does this practice limit the analysis to linear relationships, but it is also a user intensive selection process. Consequently, this practice impedes the use of quantitative and automated categorization methodologies that would facilitate streamlined reservoir characterization.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
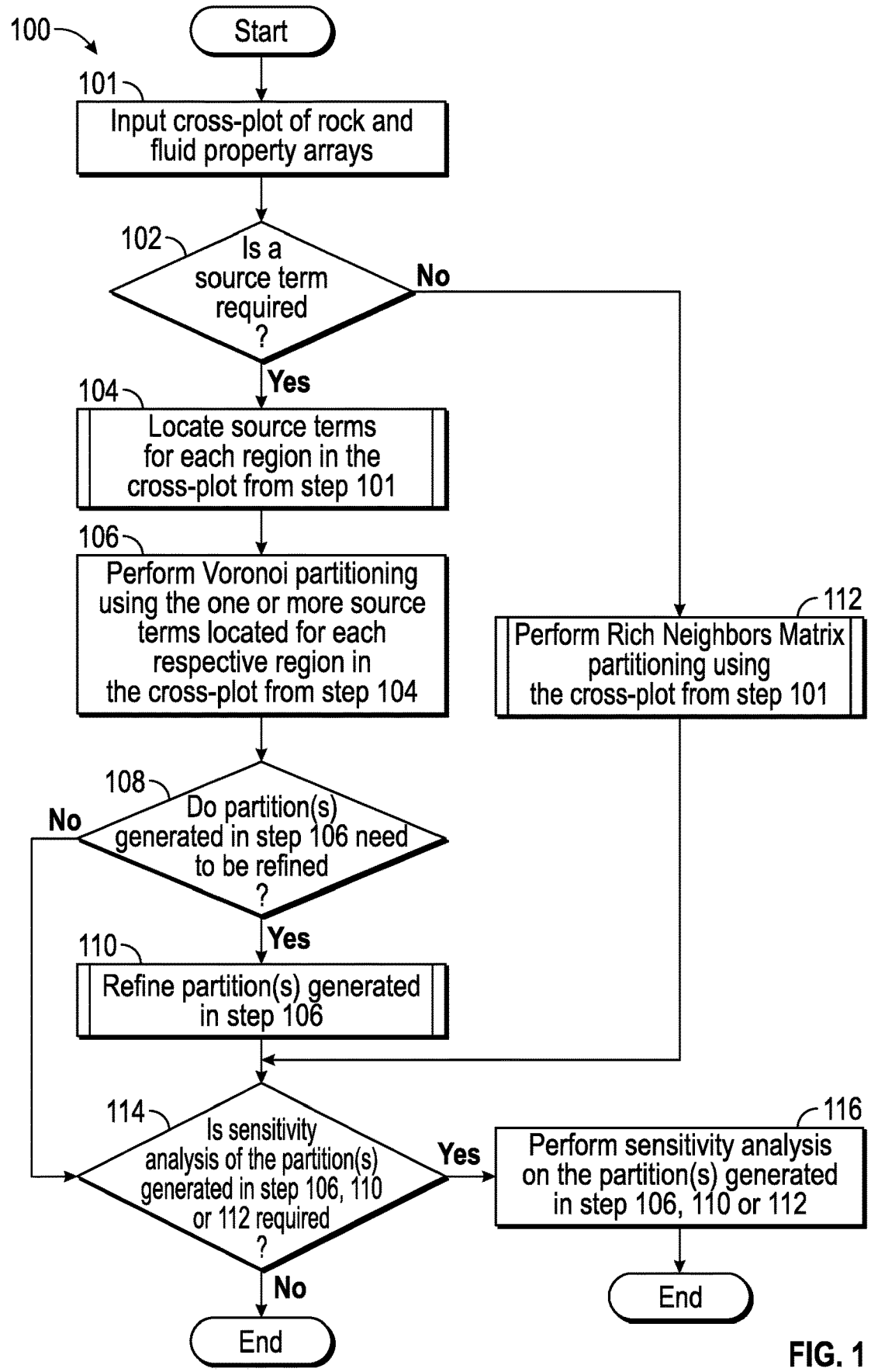
FIG. 1. is a flow diagram illustrating one embodiment of a method for implementing the present disclosure.

The present disclosure overcomes one or more deficiencies in the prior art by providing systems and methods for determining non-linear petrofacies using cross-plot partitioning to define petrofacies boundaries that distinguish the petrofacies by appearance and/or composition using systematic and automated data analysis techniques.

In one embodiment, the present disclosure includes a method for predicting hydrocarbon production from a subsurface reservoir by determining non-linear petrofacies, which comprises: i) partitioning a cross-plot using a data frequency of data points in the cross-plot and a computer processor; and ii) repartitioning the cross-plot by one of refining one or more partitions in the cross-plot using a data frequency of data points in an investigation window in the cross-plot and modifying one or more partitions in the cross-plot using a sensitivity analysis of data points in a predefined region to grow and a predefined region to reduce.

In another embodiment, the present disclosure includes a non-transitory program carrier device tangibly carrying computer-executable instructions for predicting hydrocarbon production from a subsurface reservoir by determining non-linear petrofacies, the instructions being executable to implement: i) partitioning a cross-plot using a data frequency of data points in the cross-plot; and ii) repartitioning the cross-plot by one of refining one or more partitions in the cross-plot using a data frequency of data points in an investigation window in the cross-plot and modifying one or more partitions in the cross-plot using a sensitivity analysis of data points in a predefined region to grow and a predefined region to reduce.

In yet another embodiment, the present disclosure includes a non-transitory program carrier device tangibly carrying computer-executable instructions for predicting hydrocarbon production from a subsurface reservoir by determining non-linear petrofacies, the instructions being executable to implement: i) partitioning a cross-plot using a data frequency of data points in the cross-plot; ii) repartitioning the cross-plot by modifying one or more partitions in the cross-plot using a sensitivity analysis of data points in a predefined region to grow and a predefined region to reduce; iii) measuring a distance between each data point in the region to reduce and a common partition between the region to reduce and the region to grow; and iv) normalizing each distance.

The subject matter of the present disclosure is described with specificity; however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

The following description includes automated methods for determining non-linear petrofacies using cross-plot partitioning to define petrofacies boundaries that distinguish the petrofacies by appearance and/or composition. The methods described herein also enable batch processing of multiple petrofacies determination projects simultaneously.

Referring now to FIG. 1, a flow diagram of one embodiment of a method 100 for implementing the present disclosure is illustrated.

Figure 5:
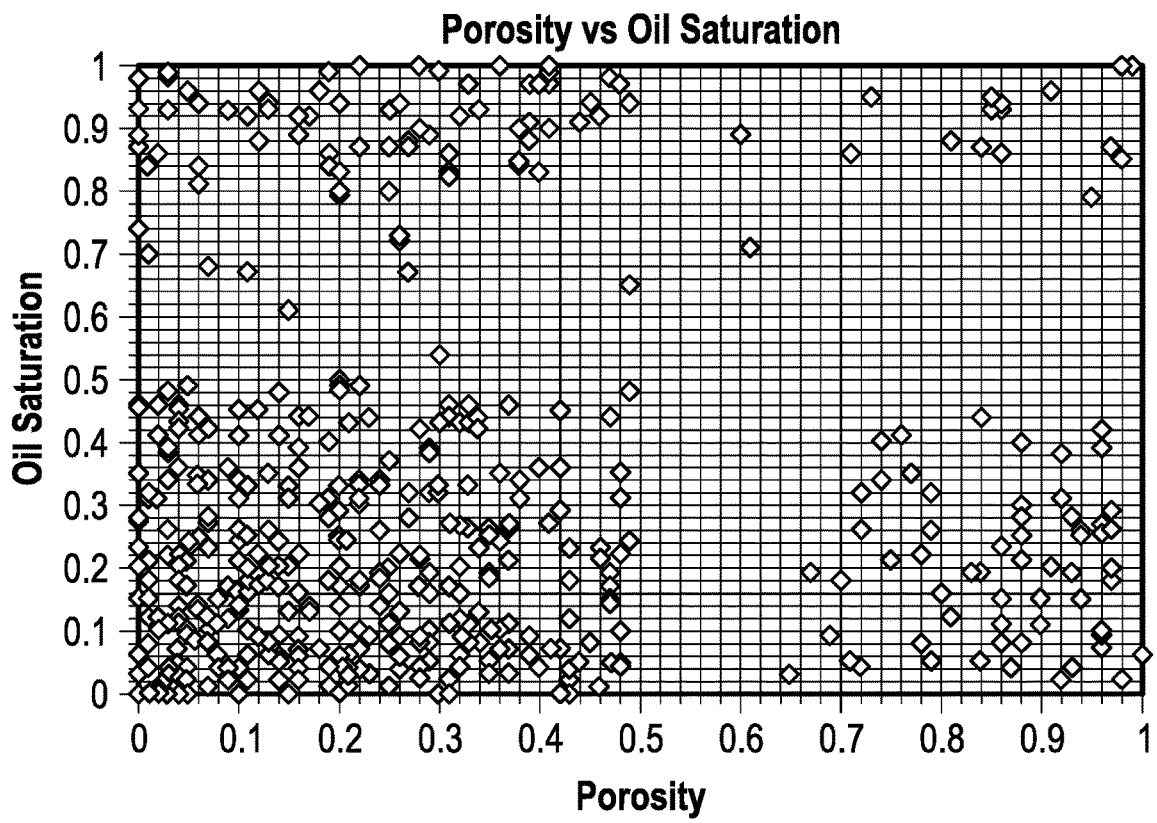
FIG. 5 is an exemplary cross-plot illustrating porosity and oil saturation for use as input in step 101 of FIG. 1.
Figure 30:
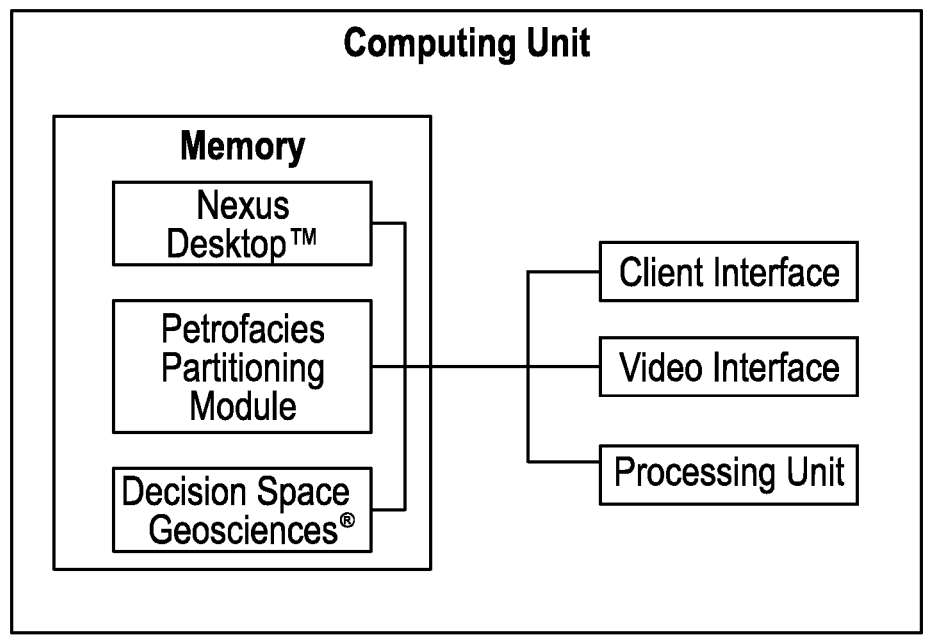
FIG. 30 is a block diagram illustrating one embodiment of a computer system for implementing the present disclosure.

In step 101, a cross-plot of rock and fluid property arrays is automatically input or may be input using the client interface and/or the video interface described further in reference to FIG. 30. The rock and fluid property arrays are obtained from a 3D geocellular grid and may include static petrophysical, rock properties and dynamic fluid properties, respectively, created with an independent property variable assigned to the X-axis of the cross-plot and a dependent property variable assigned to the Y axis of the cross-plot. An exemplary cross-plot is illustrated in FIG. 5 for porosity and oil saturation. Each point in the cross-plot represents a data point that is stored in a specific cell of the 3D geocellular grid.

In step 102, the method 100 determines whether a source term is required based on the preferred partitioning technique using the client interface and/or the video interface described further in reference to FIG. 30. If a source term is not required, then the method 100 proceeds to step 112 and performs a Rich Neighbors Matrix partitioning. Otherwise, the method 100 proceeds to step 104 to prepare for Voronoi partitioning.

In step 104, one or more source terms are located for each region in the cross-plot from step 101. One embodiment of a method for performing this step is described further in reference to FIG. 2.

Figure 6:
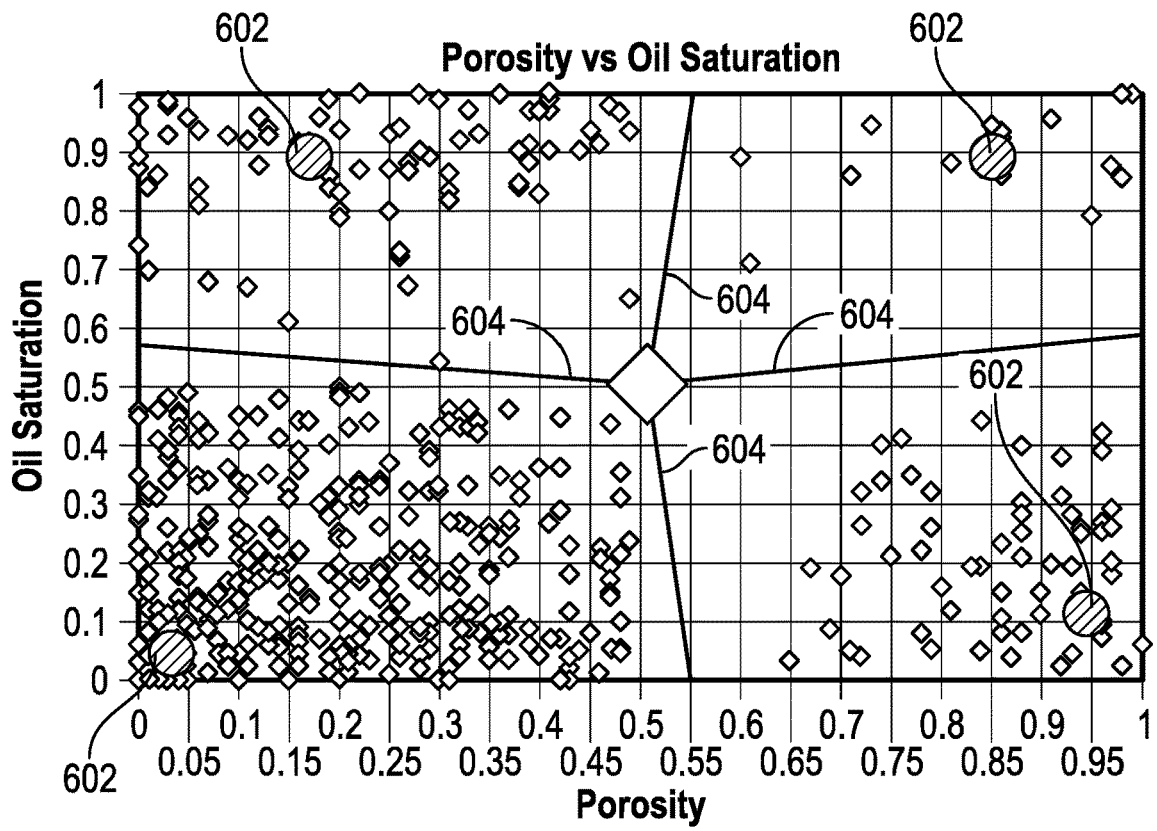
FIG. 6 is an exemplary partitioned cross-plot illustrating Voronoi partitioning in step 106 of FIG. 1.

In step 106, Voronoi partitioning is performed using the one or more source terms located for each respective region in the cross-plot from step 104 and techniques well known in the art to generate one or more partitions in the cross-plot. An exemplary Voronoi partitioning of the cross-plot in FIG. 5 is illustrated in FIG. 6 for porosity and oil saturation. Each source term 602 denotes a separate region in the cross-plot that is separated from another region in the cross-plot by a partition 604. Other examples of Voronoi partitioning include the creation of map mosaics from satellite photographs in cartography or the modeling of animal territories in zoology.

In step 108, the method 100 determines whether the partition(s) generated in step 106 need to be refined based on the accuracy of the geometry and/or connectivity of the partitions. If the partition(s) do not need to be refined, then the method 100 proceeds to step 114. Otherwise, the method 100 proceeds to step 110 to refine the partition(s).

In step 110, the partition(s) generated in step 106 are refined. One embodiment of a method for performing this step is described further in reference to FIG. 4.

In step 112, Rich Neighbors Matrix partitioning is performed using the cross-plot from step 101 to generate one or more partitions in the cross-plot. One embodiment of a method for performing this step is described further in reference to FIG. 3.

In step 114, the method determines whether a sensitivity analysis of the partition(s) generated in step 106, 110, or 112 is required based on the accuracy of the location of each partition using the client interface and/or the video interface described further in reference to FIG. 30. If a sensitivity analysis is not required, then the method 100 ends. Otherwise, the method 100 proceeds to step 116 to perform a sensitivity analysis.

Figure 7:
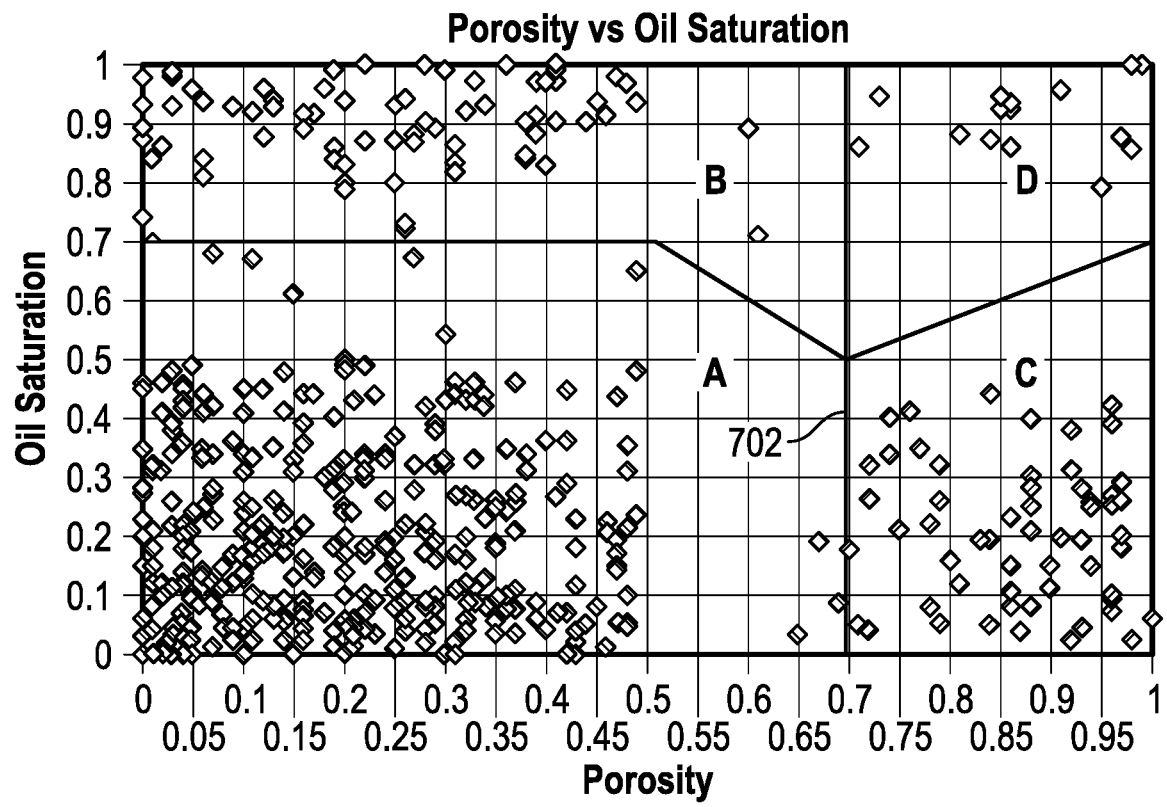
FIG. 7 is an exemplary partitioned cross-plot illustrating Rich Neighbors Matrix partitioning in step 112 of FIG. 1.
Figure 8:
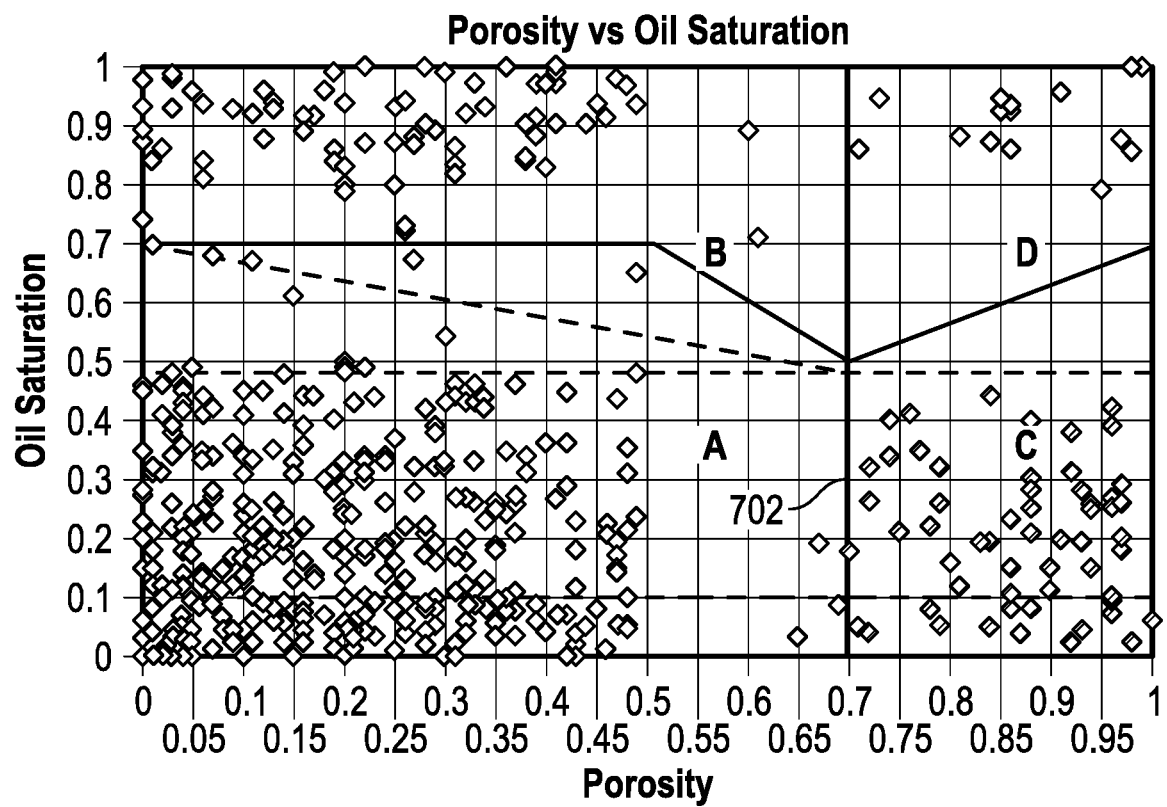
FIG. 8 is an exemplary partitioned cross-plot illustrating the sensitivity analysis in step 116 of FIG. 1.
Figure 9:
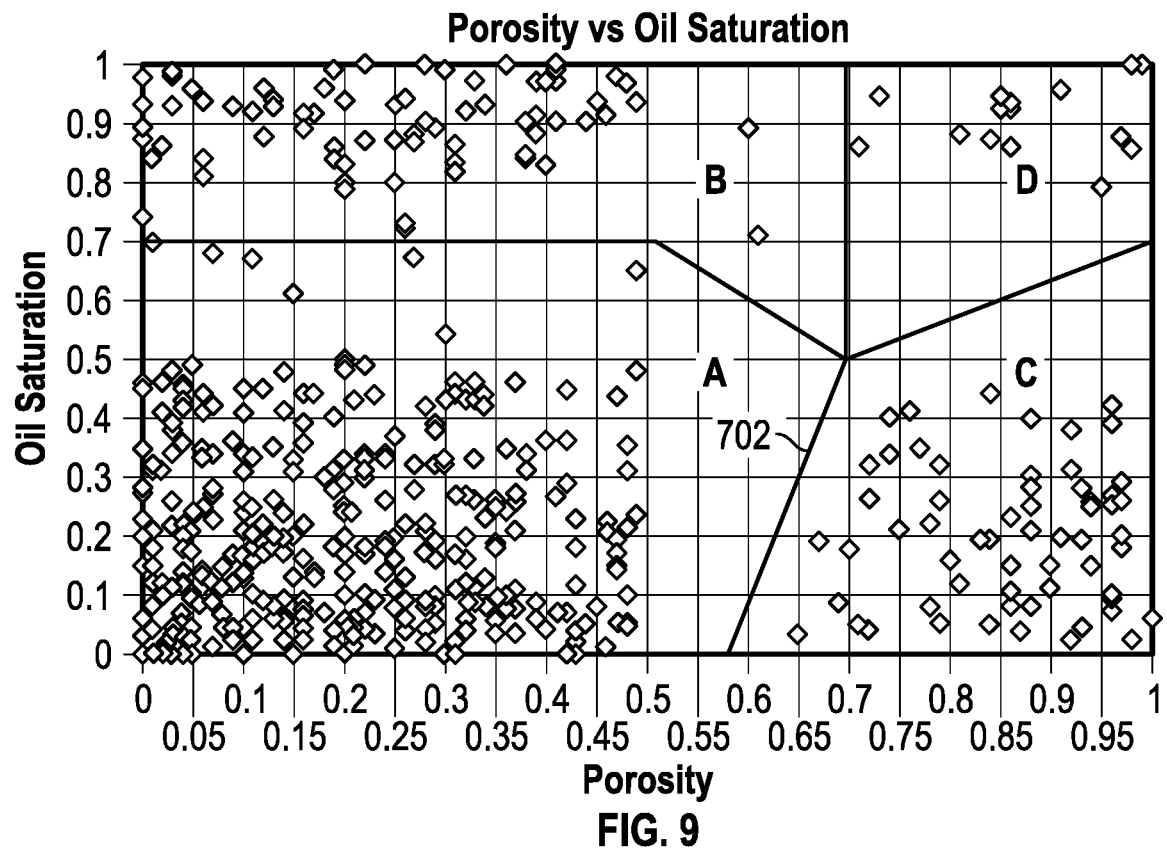
FIG. 9 is an exemplary repartitioned cross-plot illustrating a modified petrofacies map as a result of step 116 in FIG. 1.

In step 116, a sensitivity analysis is performed on the partition(s) generated in step 106, 110, or 112 using techniques well known in the art to modify the location of a partition. Using the results of step 112 as an example, the sensitivity analysis is performed on the location and geometry of predefined interrogation regions and a common partition in the partitioned cross-plot (e.g. a region to grow, a region to reduce and a common partition). In FIG. 7, for example, the results of step 112 are illustrated in a partitioned cross-plot with a predefined region to reduce (A), a predefined region to grow (C), and a common partition 702. The distance between data points in the region to reduce and the common partition are measured and normalized with respect to the largest measured distance in the region to reduce. Thus, a distance of 0 is the location of the common partition and 1 may represent the data point furthest from the common partition. Optionally, a predetermined threshold normalized distance may be assigned to the region to reduce. In FIG. 8, the dashed lines in the partitioned cross-plot of FIG. 7 illustrate the technique, however, are not normally shown. The result is a repartitioned cross-plot wherein at least one modified petrofacies map is created with a modified partition. In FIG. 9, for example, the partitioned cross-plot of FIG. 7 is shown except the partition 702 is modified compared to its position in FIG. 7. The repartitioned cross-plot may be used in assigning hydraulic conductivity according to petrofacies petrophysical properties that exist in numerical reservoir simulation. The numerical reservoir simulation results may be validated by comparing production volumes and fluid rates from the numerical reservoir simulation with actual production volumes and fluid rates. The numerical reservoir simulation results using steps 106, 110 and/or 112 may be validated in the same manner.

The partition(s) that result from steps 106, 110, 112 and 116 represent petrofacies boundaries between regions in the cross-plot. The partitioned cross-plot may be used in a numerical reservoir simulation without consideration of variability of the defined petrofacies. The numerical reservoir simulation results generated as a result of applying a repartitioned cross-plot in step 116 also allow for a comparison with the numerical reservoir simulation results generated as a result of applying a partitioned cross-plot from steps 106, 110 and/or 112.

Figure 2:
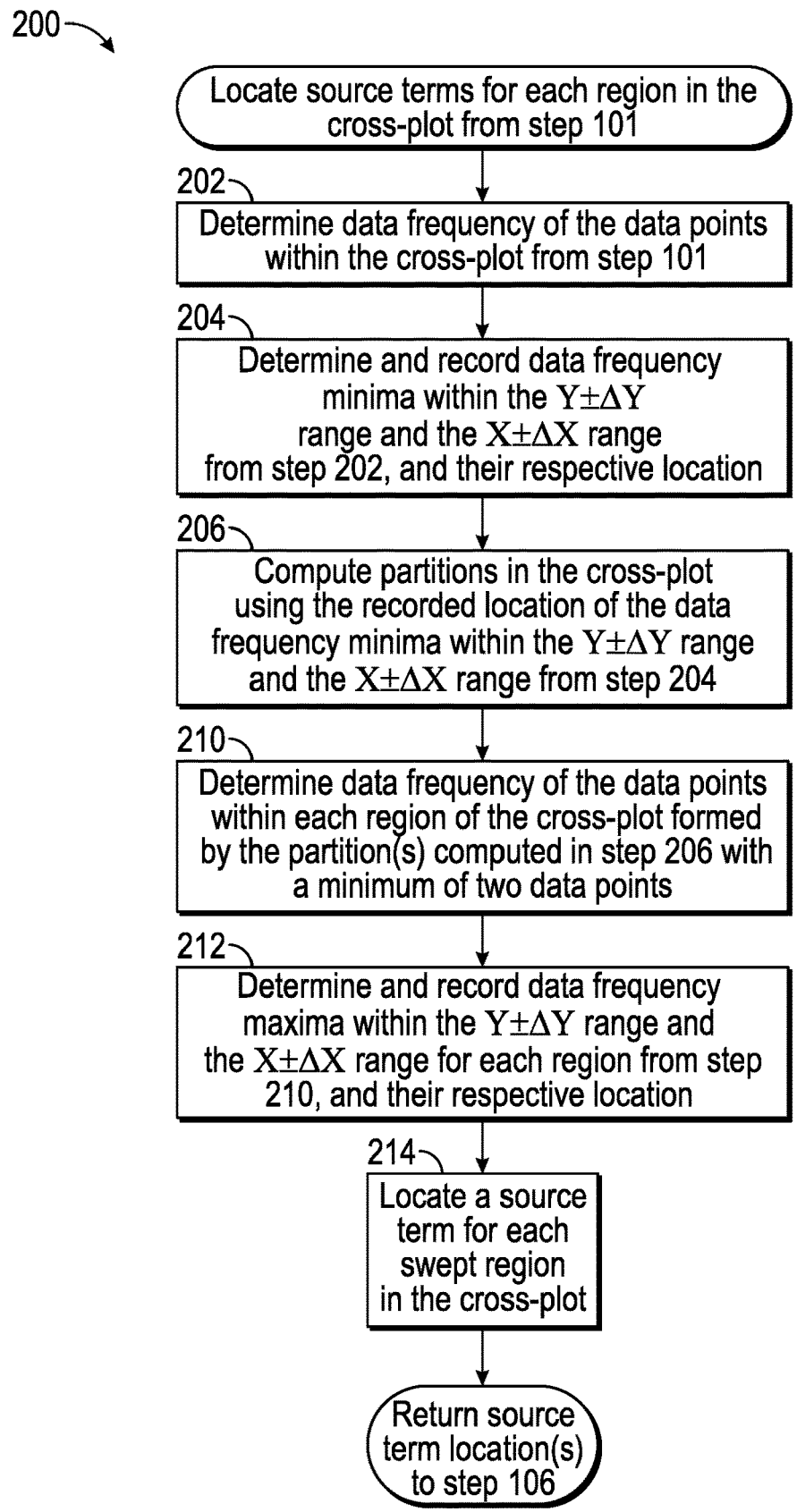
FIG. 2. is a flow diagram illustrating one embodiment of a method for performing step 104 in FIG. 1.

Referring now to FIG. 2, a flow diagram of one embodiment of a method 200 for performing step 104 in FIG. 1 is illustrated. The method 200 locates source terms within disparate data clusters to provide initial orthogonal petrofacies partitions.

Figure 10:
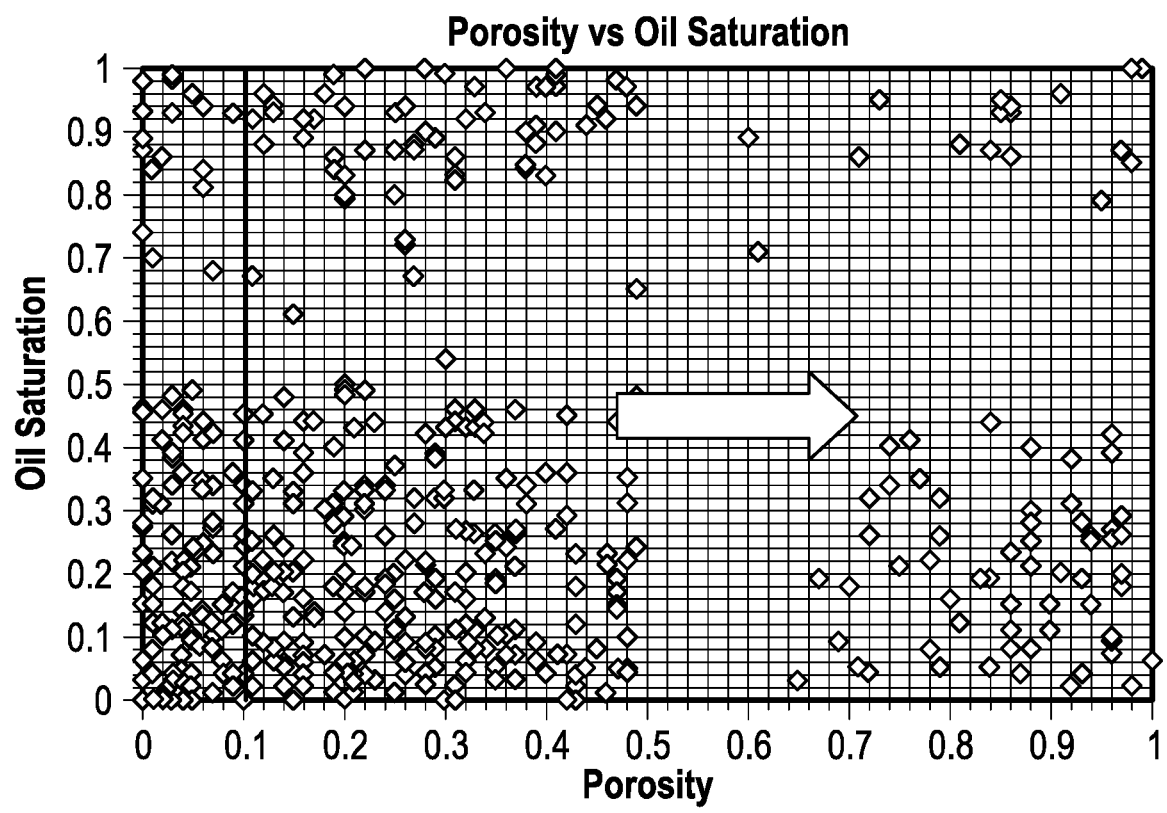
FIG. 10 is an exemplary horizontal sweep of the cross-plot in FIG. 5 illustrating step 202 in FIG. 2.
Figure 11:
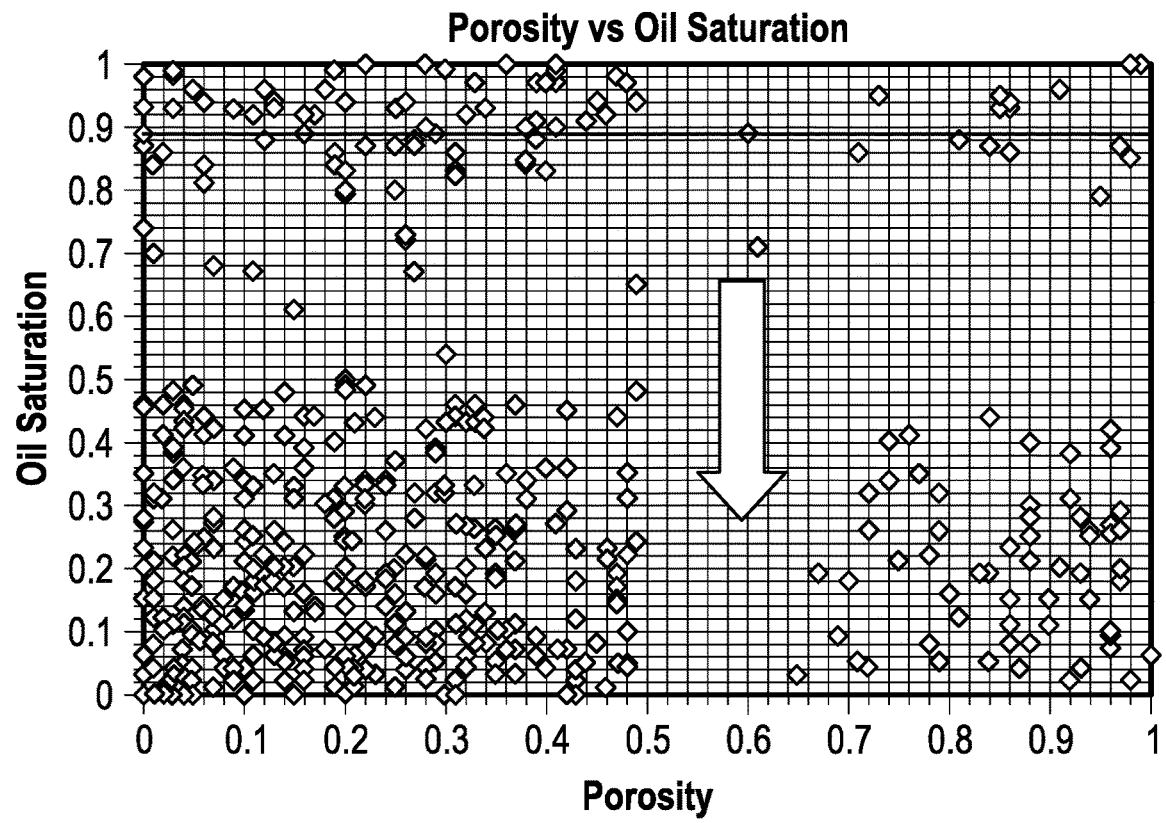
FIG. 11 is an exemplary vertical sweep of the cross-plot in FIG. 5 illustrating step 202 in FIG. 2.

In step 202, data frequency of the data points within the cross-plot from step 101 is determined by performing a horizontal sweep and a vertical sweep of the cross-plot using techniques well known in the art, a predetermined $\pm \Delta Y$ axis value about a central sweep line Y (where Y and $\Delta Y$ are real numbers) for the horizontal sweep and a predetermined $\pm \Delta X$ axis value about a central sweep line X (where X and $\Delta X$ are real numbers) for the vertical sweep. The data frequency is determined within the $Y \pm \Delta Y$ range for the horizontal sweep and the $X \pm \Delta X$ range for the vertical sweep. An exemplary horizontal sweep and vertical sweep of the cross-plot in FIG. 5 is illustrated in FIGS. 10-11, respectively.

Figure 12:
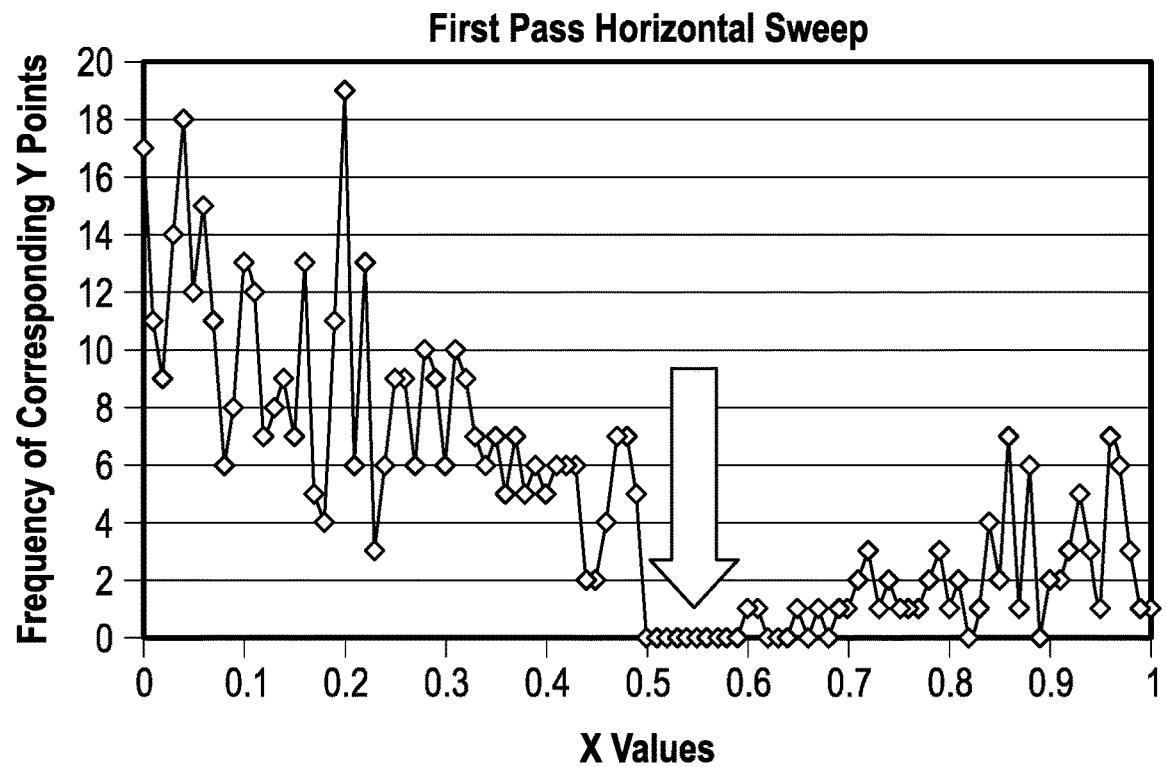
FIG. 12 is the data frequency minima for the horizontal sweep in FIG. 10 illustrating step 204 in FIG. 2.
Figure 13:
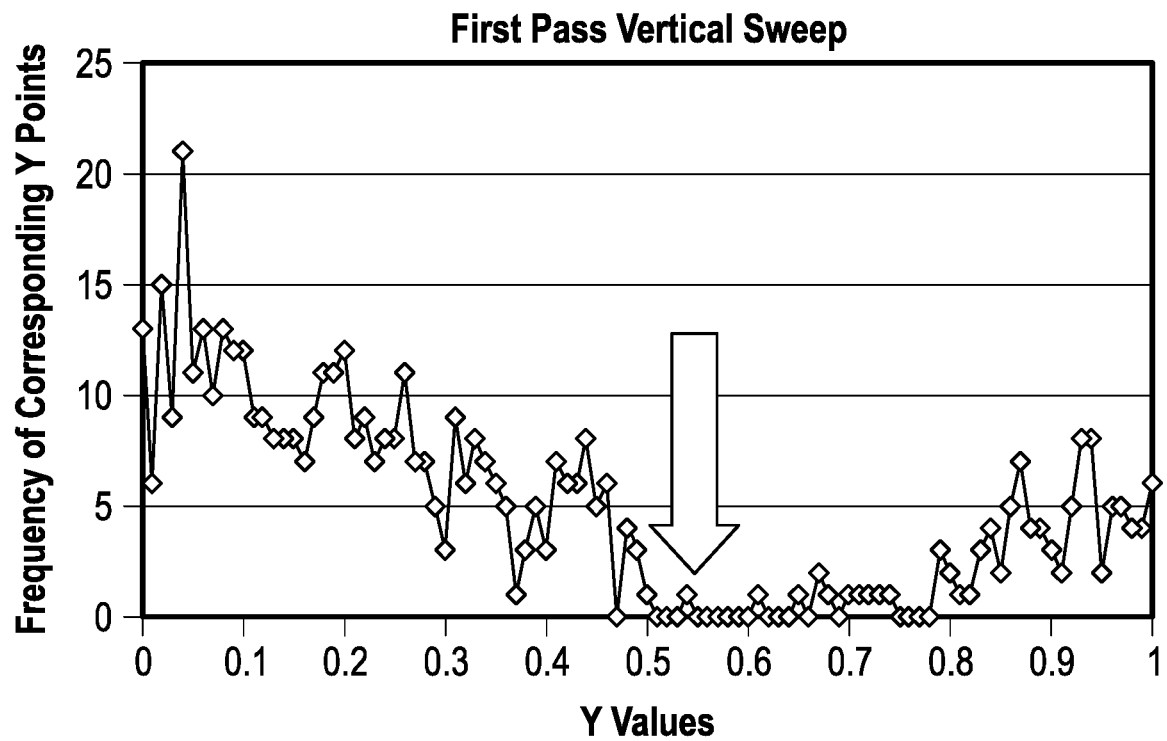
FIG. 13 is the data frequency minima for the vertical sweep in FIG. 11 illustrating step 204 in FIG. 2.

In step 204, the data frequency minima within the $Y \pm \Delta Y$ range and the $X \pm \Delta X$ range from step 202, and their respective location, are determined and recorded using techniques well known in the art. The location of data frequency minima along the lines of sweep represents the location of a vertical or horizontal partition to enforce. The data frequency minima for the horizontal sweep in FIG. 10 and the vertical sweep in FIG. 11 are illustrated by the arrows in FIGS. 12-13 within the $X \pm \Delta X$ range and the $Y \pm \Delta Y$ range, respectively.

In step 206, one or more partitions in the cross-plot are computed using the recorded location of the data frequency minima within the $Y \pm \Delta Y$ range and the $X \pm \Delta X$ range from step 204. Because the partitions are either vertical or horizontal, they will intersect in the cross-plot to form initial petrofacies boundaries between regions in the cross-plot of FIG. 5, for example, as illustrated by the four (4) partitioned regions A-D in FIG. 14.

In step 210, data frequency of the data points within each region of the cross-plot formed by the partition(s) computed in step 206 with a minimum of two data points is determined by performing a horizontal sweep and a vertical sweep of each region using techniques well known in the art, a predetermined $\pm \Delta Y$ axis value about a central sweep line Y (where Y and $\Delta Y$ are real numbers) for the horizontal sweep and a predetermined $\pm \Delta X$ axis value about a central sweep line X (where X and $\Delta X$ are real numbers) for the vertical sweep. The data frequency is determined within the $Y \pm \Delta Y$ range for the horizontal sweep and the $X \pm \Delta X$ range for the vertical sweep.

Figure 14:
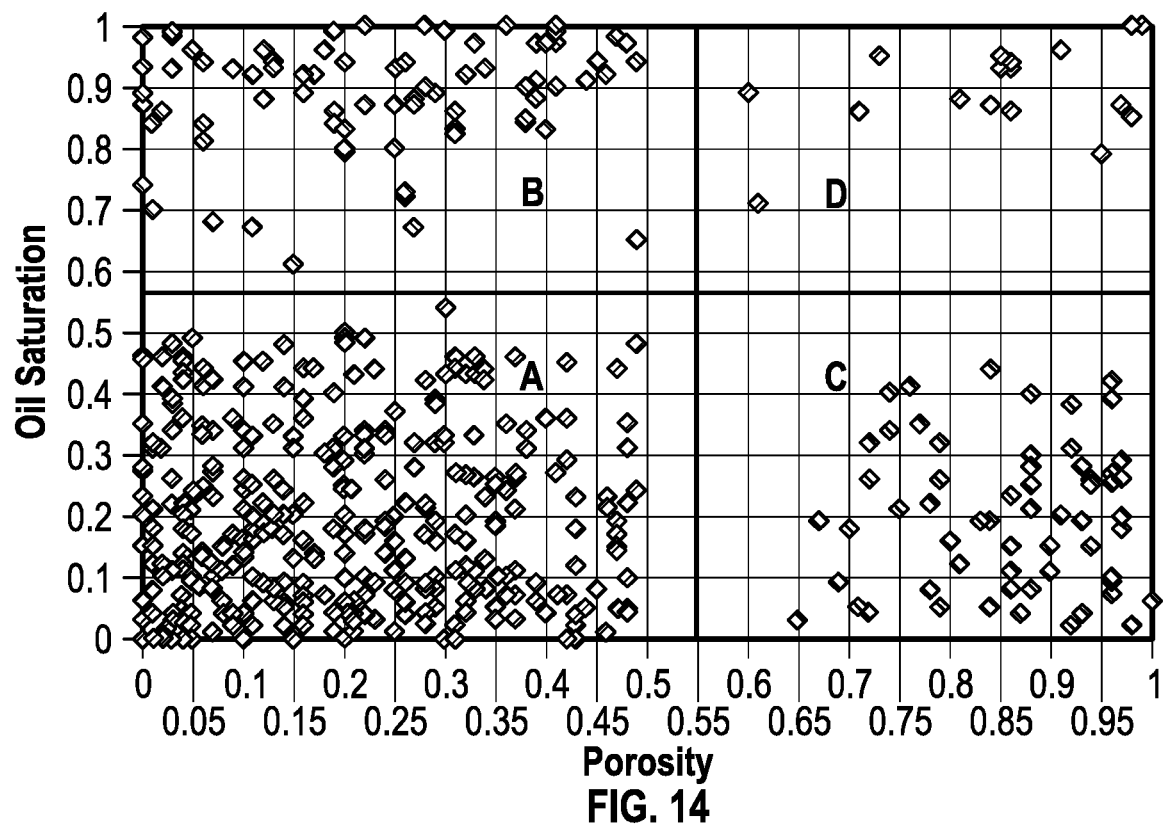
FIG. 14 is the cross-plot in FIG. 5 illustrating four (4) regions A-D as a result of step 206 in FIG. 2.
Figure 15:
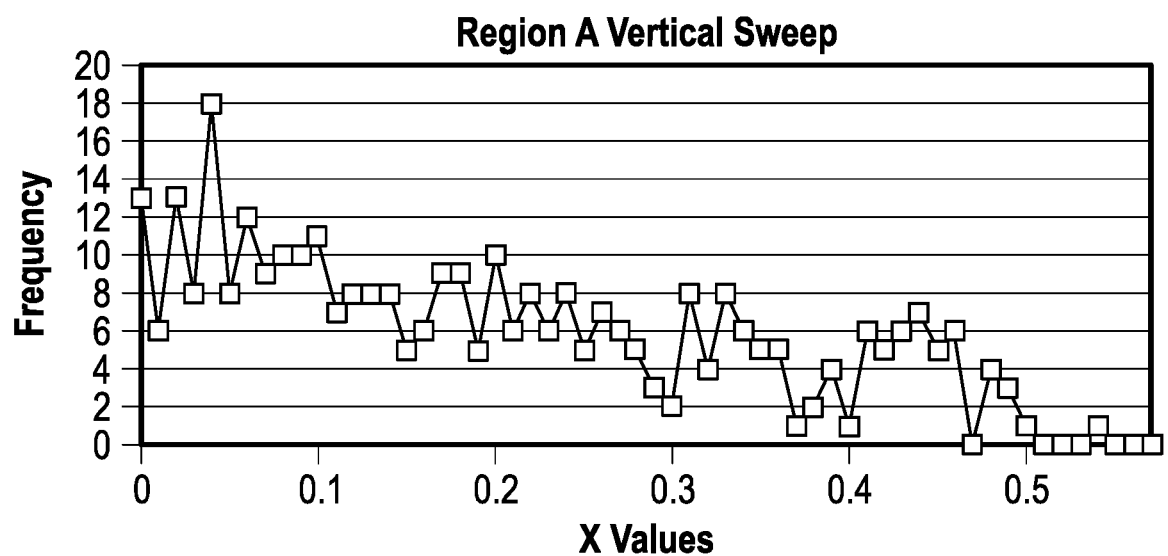
FIGS. 15-16 illustrate an exemplary vertical sweep and horizontal sweep of region A in FIG. 14, respectively.
Figure 16:
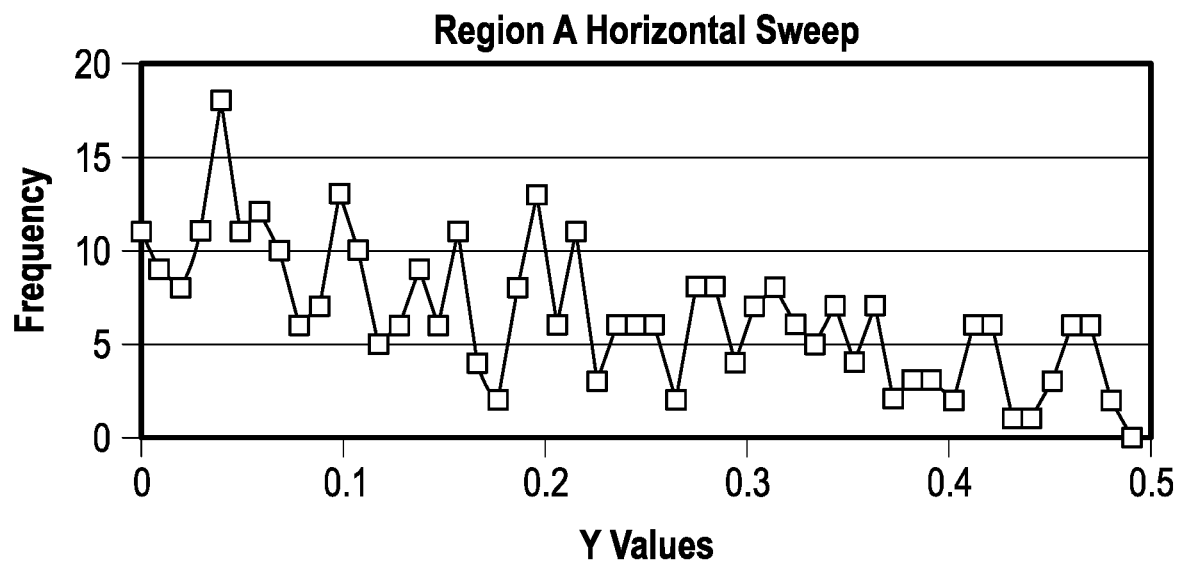
Figure 17:
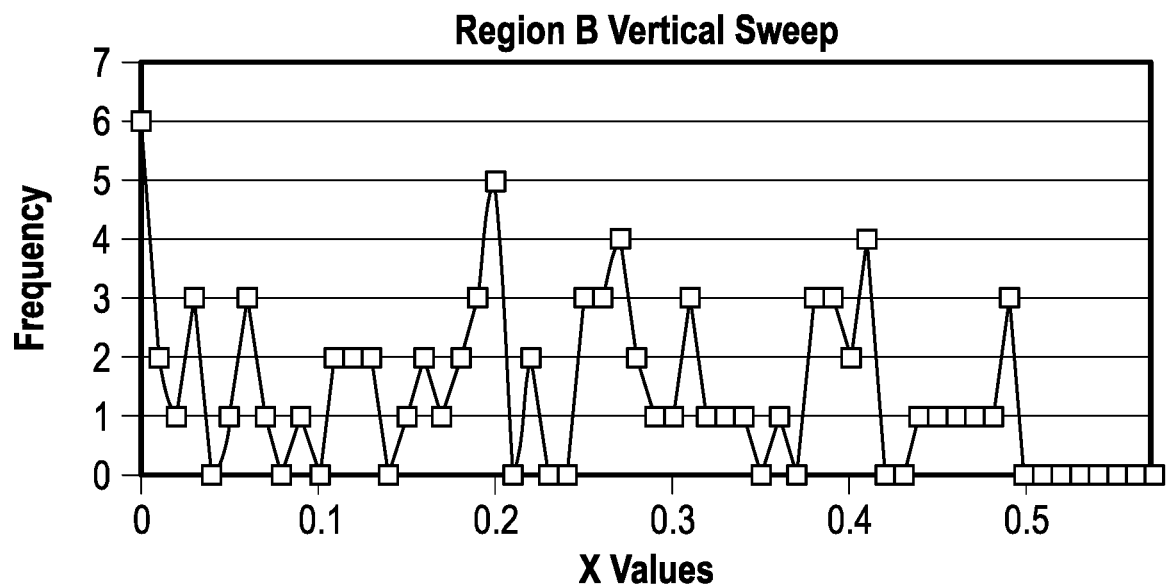
FIGS. 17-18 illustrate an exemplary vertical sweep and horizontal sweep of region B in FIG. 14, respectively.
Figure 18:
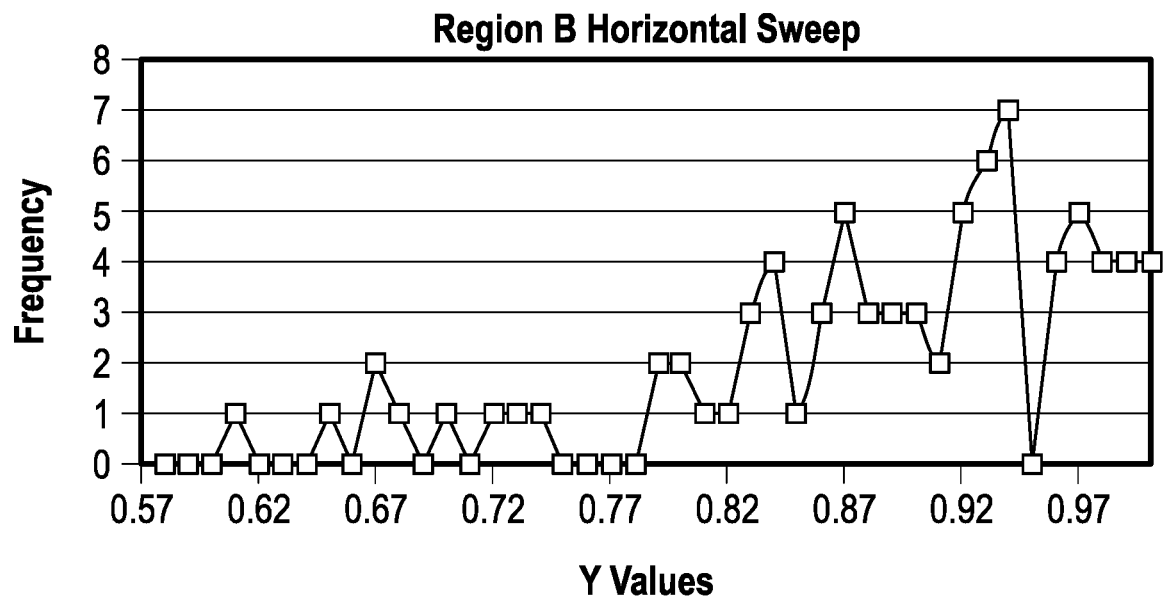
Figure 19:
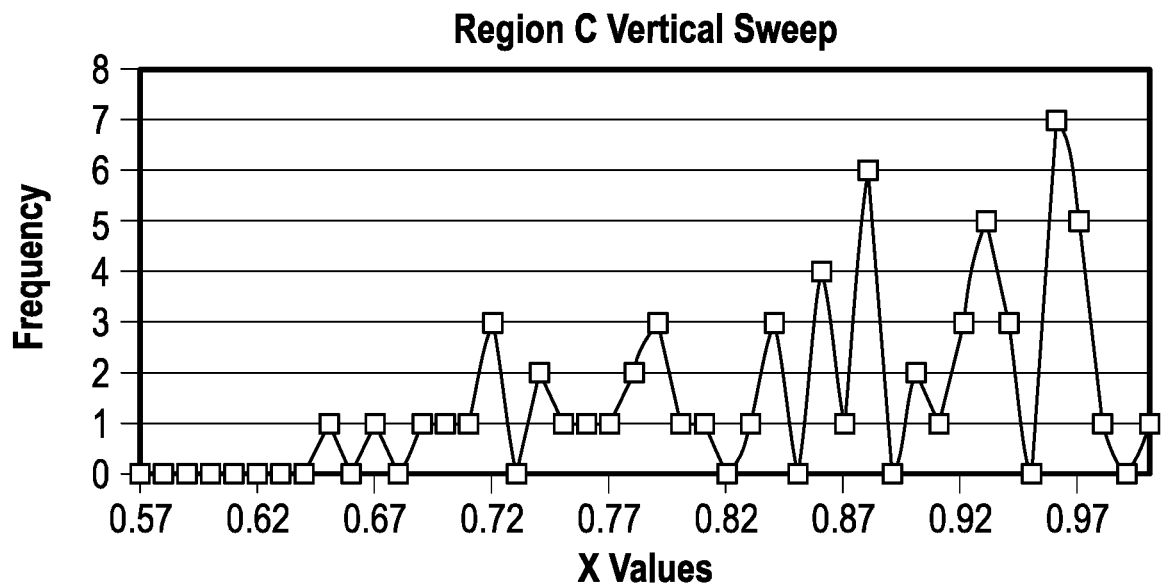
FIGS. 19-20 illustrate an exemplary vertical sweep and horizontal sweep of region C in FIG. 14, respectively.
Figure 20:
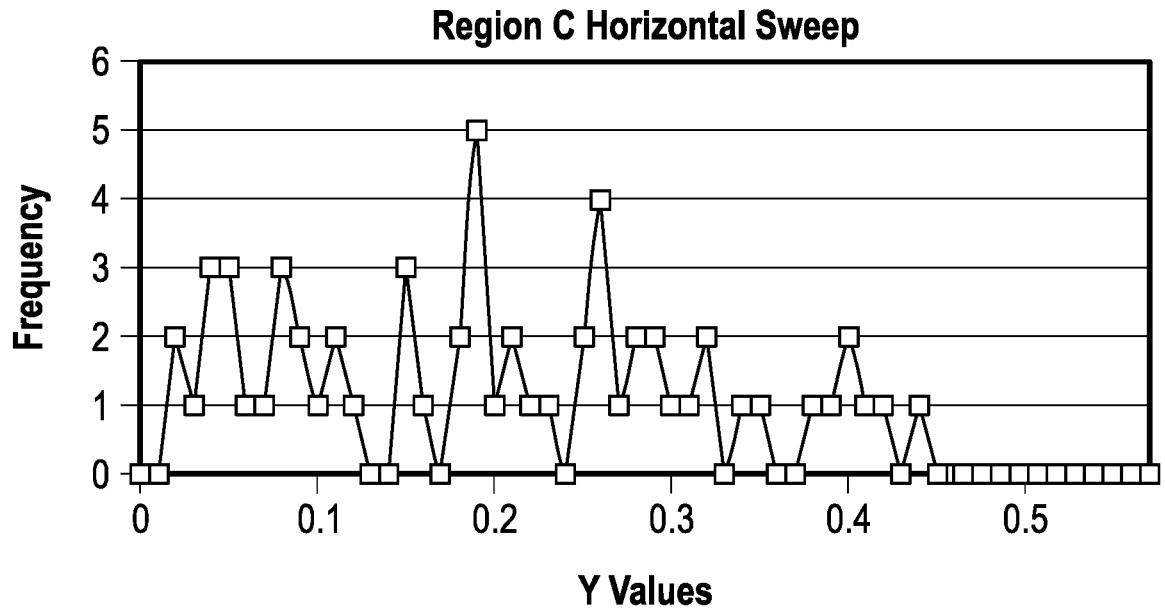
Figure 21:
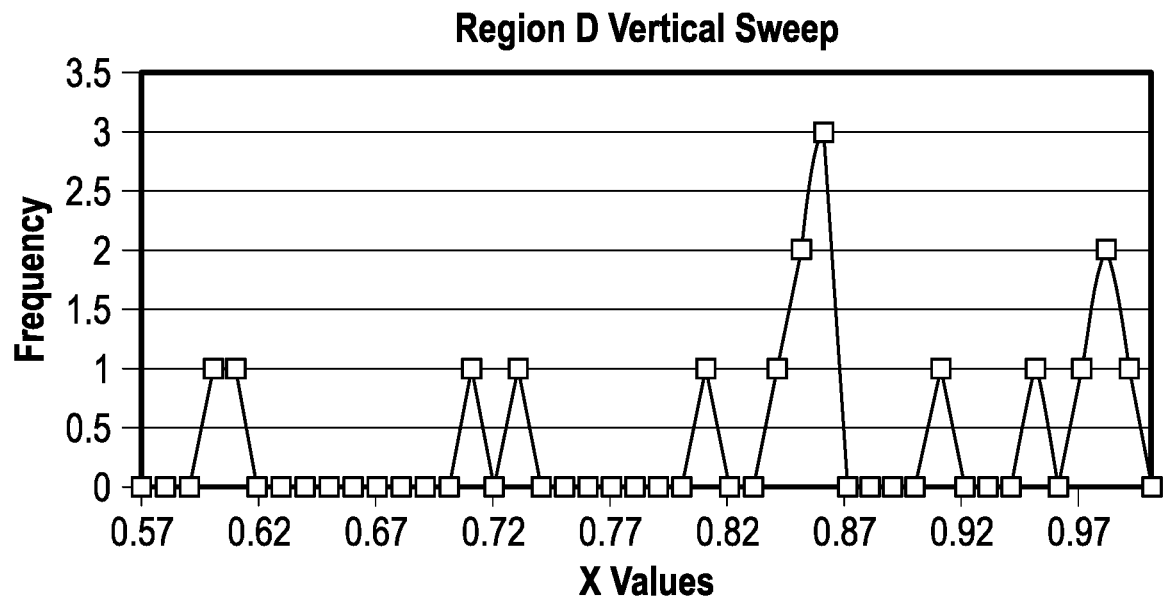
FIGS. 21-22 illustrate an exemplary vertical sweep and horizontal sweep of region D in FIG. 14, respectively.
Figure 22:
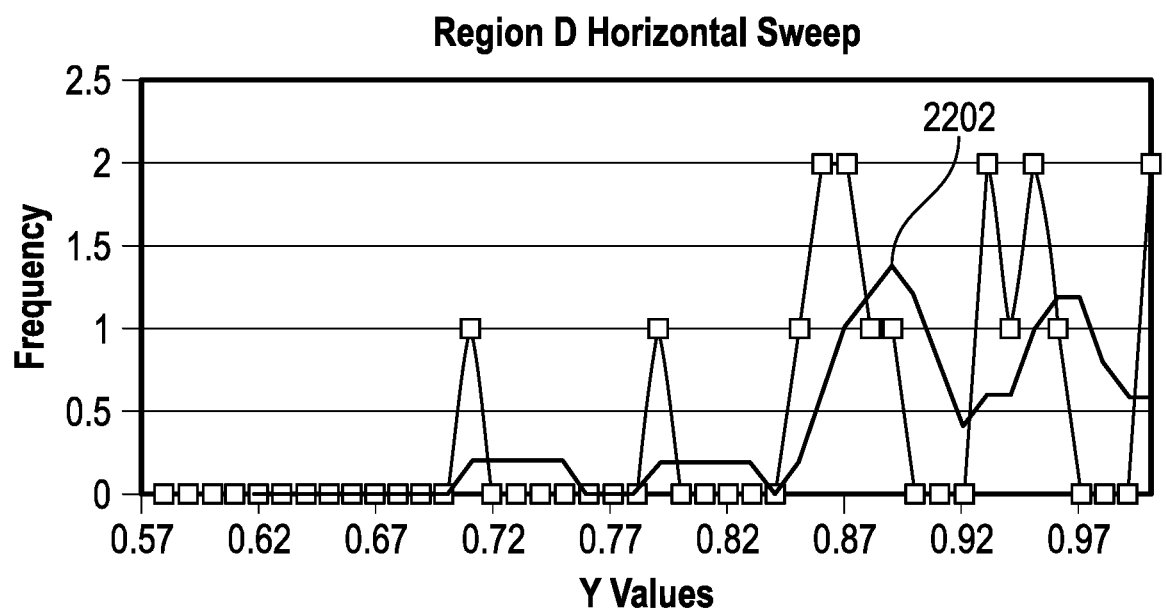

In step 212, the data frequency maxima within the $Y \pm \Delta Y$ range and the $X \pm \Delta X$ range for each region from step 210, and their respective location, are determined and recorded using techniques well known in the art. As a result, a line is generated in the region corresponding to the location of the data frequency maxima within the $Y \pm \Delta Y$ range and another line is generated in the region corresponding to the location of the data frequency maxima within the $X \pm \Delta X$ range. An exemplary vertical sweep and horizontal sweep of each non-swept region A-D in FIG. 14 is illustrated in FIGS. 15-16, respectively, for region A, FIGS. 17-18, respectively, for region B, FIGS. 19-20, respectively, for region C, and FIGS. 21-22, respectively, for region D. The global maxima on each line is defined as a source term and if more than one maxima is detected, the sweep may be averaged over the multiple maxima to determine an average maxima as illustrated by the average line 2202 in FIG. 22.

Figure 23:
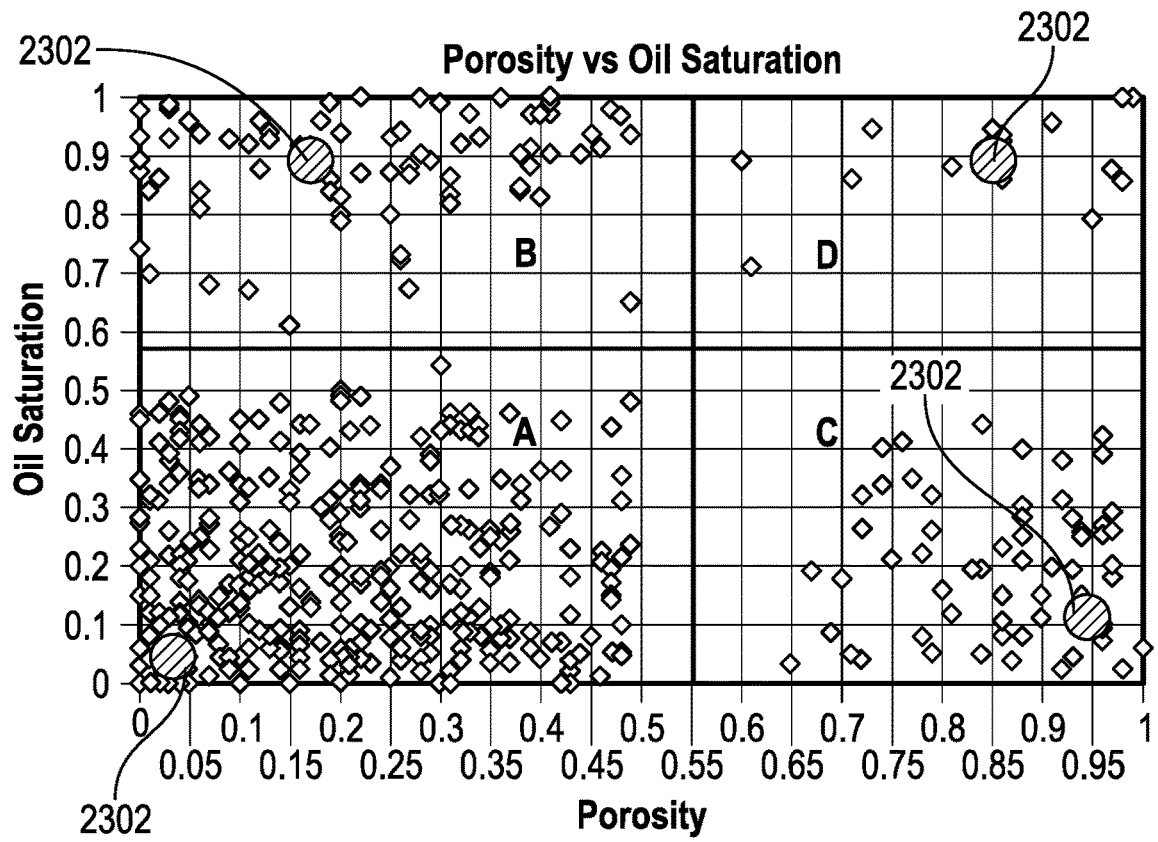
FIG. 23 is the cross-plot in FIG. 14 illustrating a source term in each region A-D as a result of step 214 in FIG. 2.

In step 214, a source term is located for each swept region in the cross-plot. The location of each source term in a respective swept region is the intersection of each line in the region formed by the location of the data frequency maxima within the $Y \pm \Delta Y$ range and the $X \pm \Delta X$ range from step 212. The location of each source term for a respective swept region in the cross-plot is returned to step 106 in FIG. 1. In FIG. 23, for example, the location of the source term for each swept region A-D in FIG. 14 is illustrated by the source points 2302.

Figure 3:
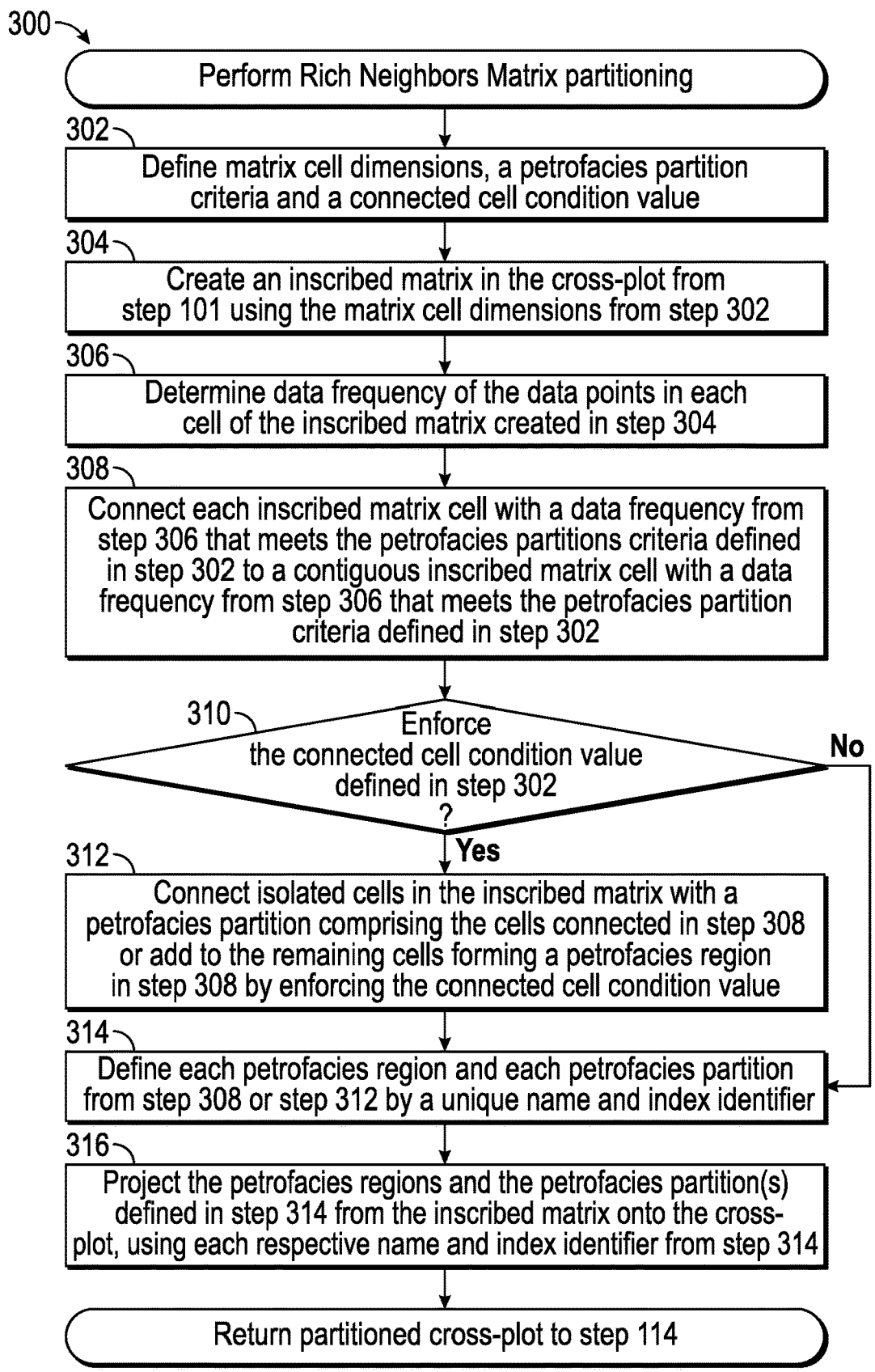
FIG. 3. is a flow diagram illustrating one embodiment of a method for performing step 112 in FIG. 1.

Referring now to FIG. 3, a flow diagram of one embodiment of a method 300 for performing step 112 in FIG. 1 is illustrated. The method 300 identifies petrofacies groups in a cross-plot of petrophysical data, but does not require the identification of a source term.

In step 302, matrix cell dimensions (e.g. number of matrix cells in X and Y dimensions of the cross-plot from step 101), a petrofacies partition criteria and a connected cell condition value are defined using the client interface and/or the video interface described further in reference to FIG. 30. A petrofacies region criteria is implicitly defined by the petrofacies partition criteria. If, for example, the petrofacies partition criteria is any integer including two or less, then the petrofacies region criteria is all integers above two. The petrofacies partition criteria and the connected cell condition value are defined in terms of an integer value. The connected cell condition value may be any integer from one to eight considering that the geometry of each cell is a quadrilateral.

Figure 24:
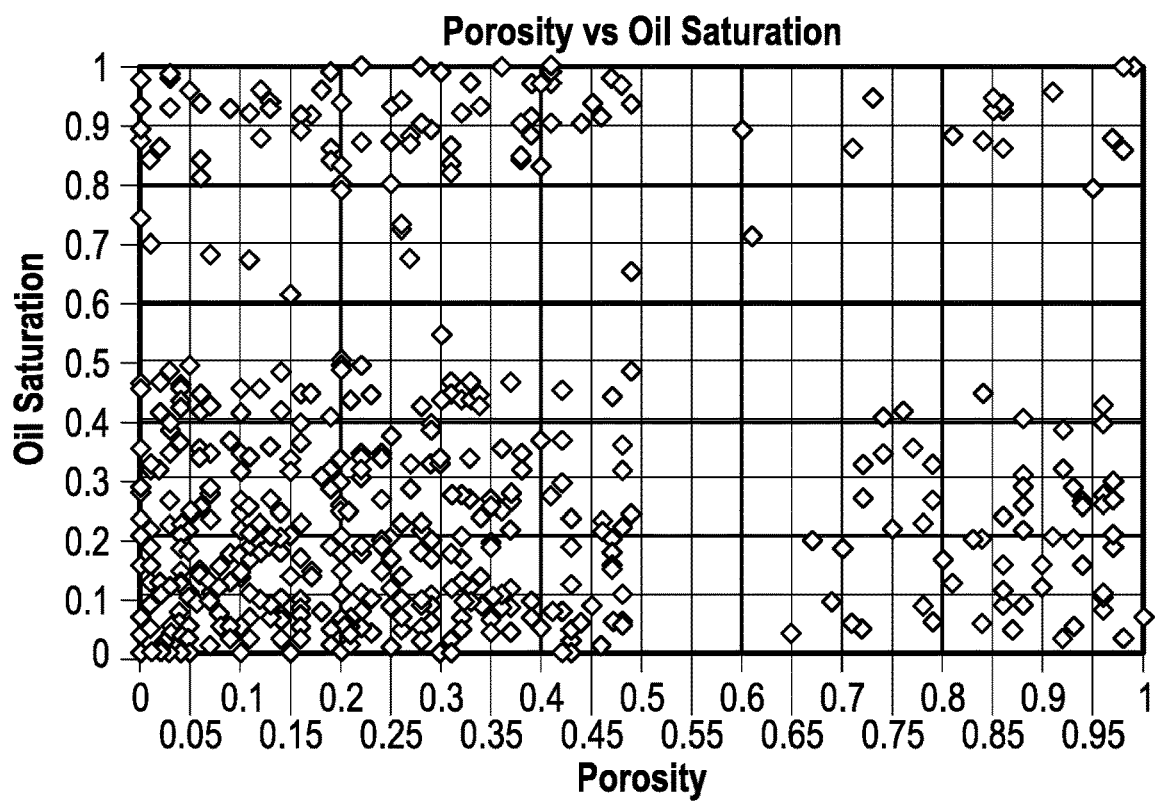
FIG. 24 is the cross-plot in FIG. 5 illustrating an inscribed matrix created as a result of step 304 in FIG. 3.

In step 304, an inscribed matrix is created in the cross-plot from step 101 using the matrix cell dimensions from step 302 and techniques well known in the art for creating an inscribed matrix. An exemplary inscribed matrix for the cross-plot in FIG. 5 is illustrated in FIG. 24.

Figure 25:
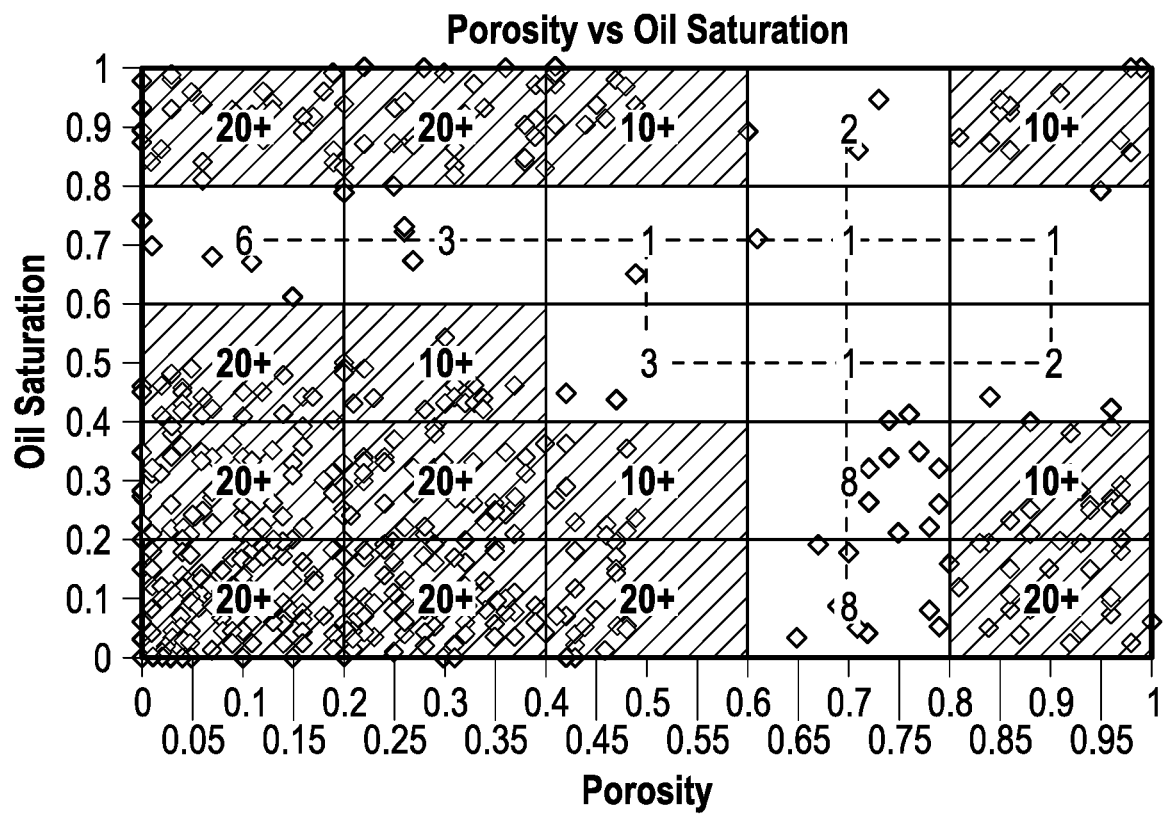
FIG. 25 is the inscribed matrix of FIG. 24 illustrating the data frequency of the data points in each cell as a result of step 306 in FIG. 3.

In step 306, the data frequency of the data points in each cell of the inscribed matrix created in step 304 is determined by counting the data points in the XY range ($X_{min} < X < X_{max}$; $Y_{min} < Y < Y_{max}$) for each cell of the inscribed matrix. The data frequency of the data points in each cell of the inscribed matrix in FIG. 24 is illustrated by the numbers in each cell of the inscribed matrix in FIG. 25, wherein each number represents the number of data points counted for a respective cell. Thus, 20+ and 10+ represent more than 20 and more than 10 data points for a respective cell, respectively.

In step 308, each inscribed matrix cell with a data frequency from step 306 that meets the petrofacies partition criteria defined in step 302 is connected to a contiguous (i.e. having a common face and/or corner) inscribed matrix cell with a data frequency from step 306 that meets the petrofacies partition criteria defined in step 302 using any well-known connectivity algorithm such as, for example, connectivity algorithms routinely used in image reconstruction/analysis, as well as non-destructive evaluation of porous media in civil and petroleum engineering. An implicit result of the connected cells is the creation of one or more petrofacies regions comprising the remaining unconnected cells in the inscribed matrix, which are bound by one or more petrofacies partitions comprising the connected cells. In the example illustrated by FIG. 25, the petrofacies partition criteria is 8 or less. As a result, those cells with a data frequency that meet the petrofacies partition criteria are connected by the dashed lines. The connections represent a petrofacies partition that separates the four (4) petrofacies regions represented by the shaded cells.

In step 310, the method 300 determines whether to enforce the connected cell condition value defined in step 302 based on the detection of one or more isolated cells in the inscribed matrix using the client interface and/or the video interface described further in reference to FIG. 30. An isolated cell is any cell in the inscribed matrix that is not connected to another cell as a result of step 308 and has a face that does not touch a face of another cell belonging to the same group as the isolated cell (i.e. belonging to a group with a data frequency that meets the petrofacies partition criteria or the petrofacies region criteria). If there are no isolated cells in the inscribed matrix, then the connected cell condition value does not need to be enforced and the method 300 proceeds to step 314. Otherwise, the method 300 proceeds to step 312 to enforce the connected cell condition value. In the example illustrated by FIG. 25, there are no isolated cells so the connected cell condition value defined in step 302 is inapplicable and the method 300 would proceed to step 314.

In step 312, the isolated cells in the inscribed matrix are connected with a petrofacies partition comprising the cells connected in step 308 or they are added to the remaining cells forming a petrofacies region in step 308 by enforcing the connected cell condition value. If the same numbers of cells surrounding an isolated cell (i.e. having a common face and/or corner) as the connected cell condition value have the same data frequency, then the isolated cell belongs to that group of cells with a data frequency that meets the petrofacies partition criteria or the petrofacies region criteria. In this manner, each isolated cell is either connected with a petrofacies partition comprising the cells connected in step 308 or it is added to the remaining cells forming a petrofacies region in step 308.

In step 314, each petrofacies region and each petrofacies partition from step 308 or step 312 is defined by a unique name and index identifier using the client interface and/or the video interface described further in reference to FIG. 30.

Figure 26:
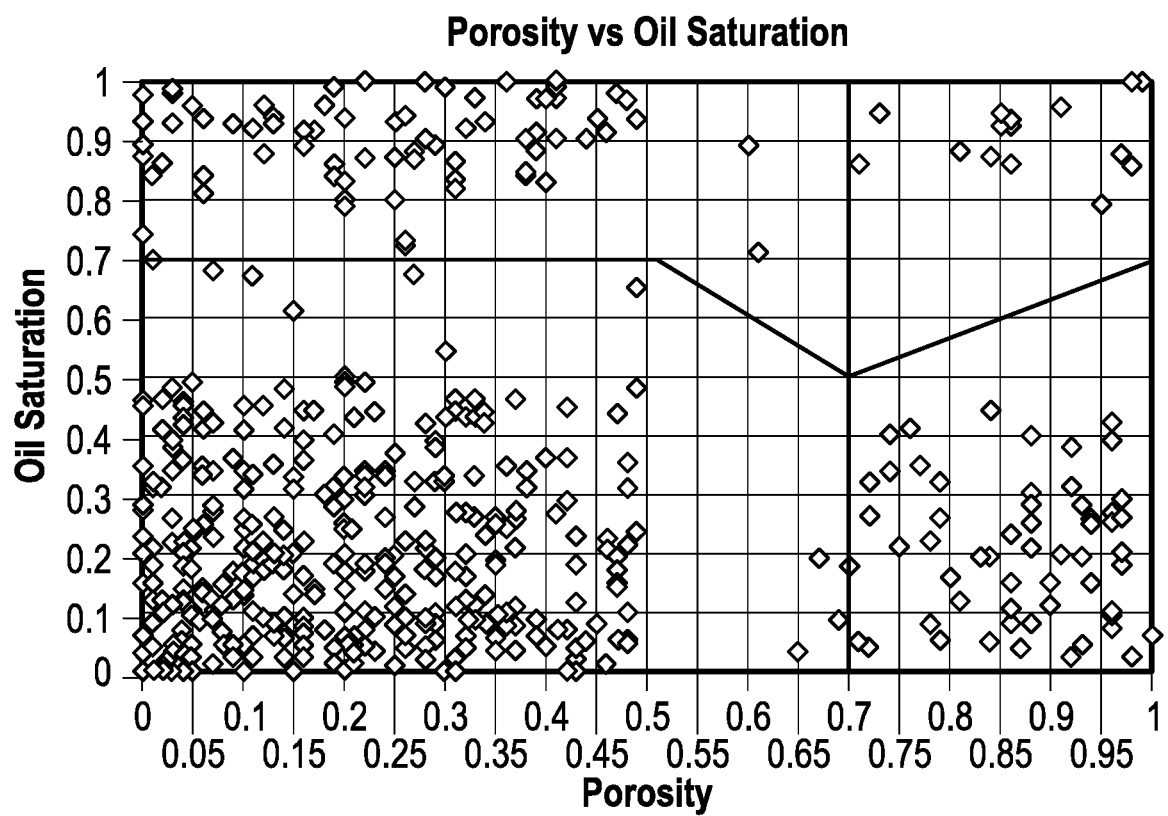
FIG. 26 is a partitioned cross-plot illustrating the projection of the four (4) petrofacies regions and the petrofacies partition onto the cross-plot in FIG. 5 as a result of step 316 in FIG. 3.

In step 316, the petrofacies regions and the petrofacies partitions defined in step 314 are projected from the inscribed matrix onto the cross-plot, which may be scaled according to the resolution of the cross-plot, using each respective name and index identifier from step 314. The partitions in the cross-plot are returned to step 114 in FIG. 1. The projection of the four (4) petrofacies regions and the petrofacies partition defined in step 314 from the inscribed matrix in FIG. 25 onto the cross-plot in FIG. 5 is illustrated in FIG. 26.

Figure 4:
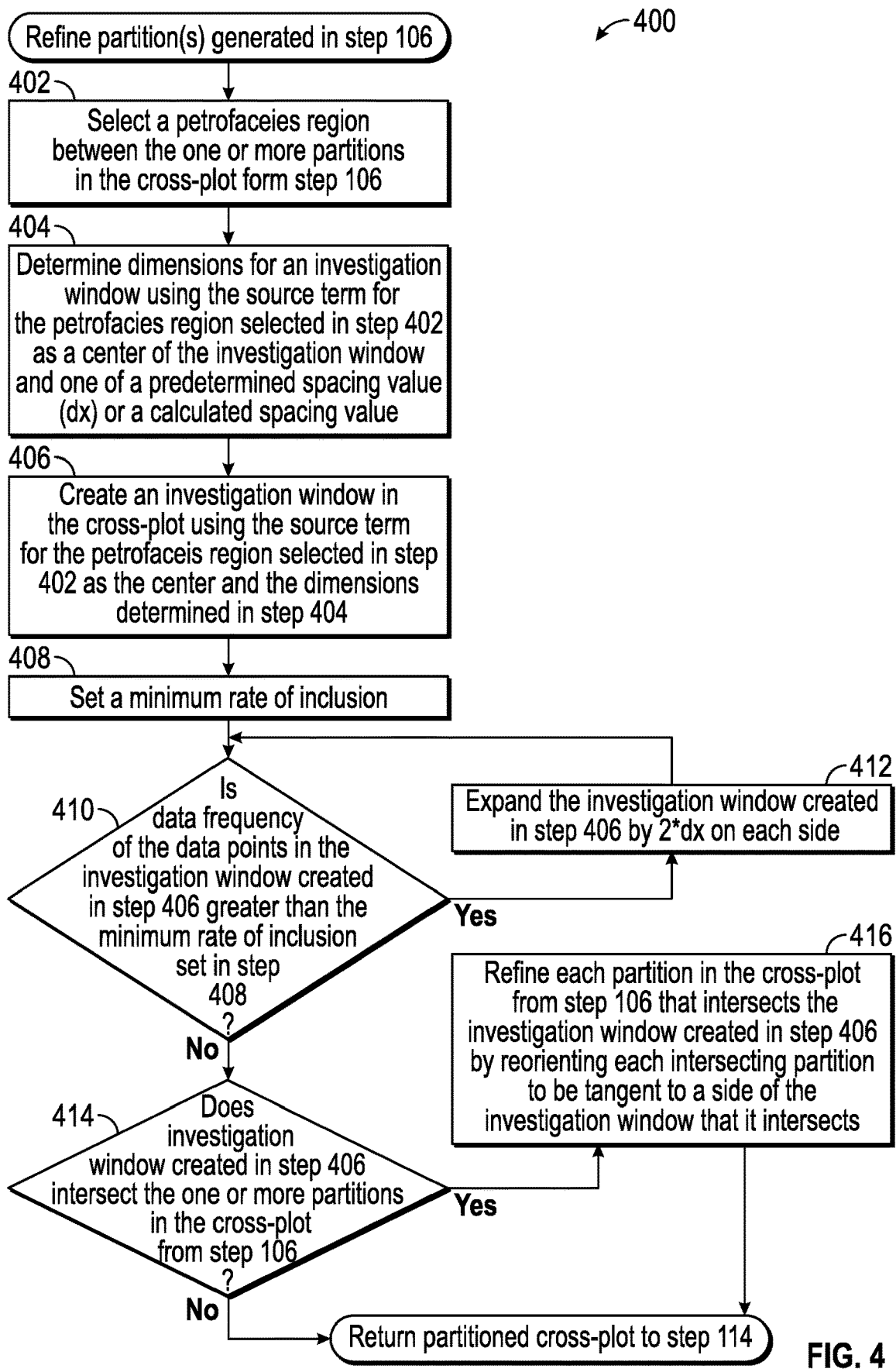
FIG. 4. is a flow diagram illustrating one embodiment of a method for performing step 110 in FIG. 1.

Referring now to FIG. 4, a flow diagram of one embodiment of a method 400 for performing step 110 in FIG. 1 is illustrated.

In step 402, a petrofacies region is selected between the one or more partitions in the cross-plot from step 106 using the client interface and/or the video interface described further in reference to FIG. 30. The selected petrofacies region includes a source term located in step 104 that is automatically detected.

Figure 27:
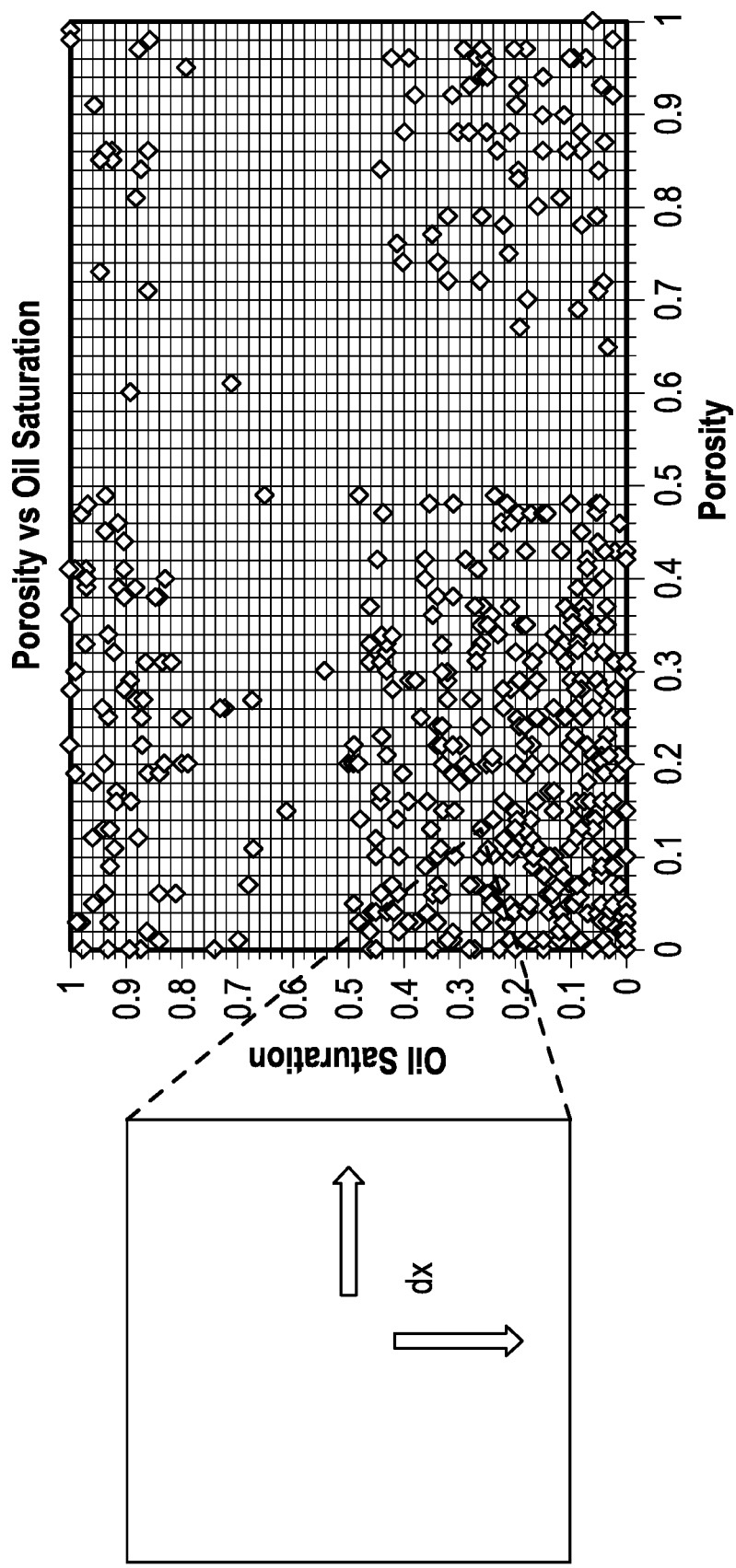
FIG. 27 is an exemplary investigation window for the cross-plot in FIG. 5 illustrating step 404 in FIG. 4.

In step 404, dimensions for an investigation window are determined using the source term for the petrofacies region selected in step 402 as a center of the investigation window and one of a predetermined spacing value (dx) or a calculated spacing value using dx=p/m where (p) is the distance between the source term for the petrofacies region selected in step 402 and the closest partition in the cross-plot from step 106, and (m) is the number of even spacings desired between the source term and the closest partition. An exemplary investigation window for the cross-plot in FIG. 5 is illustrated in FIG. 27.

In step 406, an investigation window is created in the cross-plot using the source term for the petrofacies region selected in step 402 as the center and the dimensions (i.e. dx) determined in step 404. The investigation window may be created by adding concentric cells of 2*dx about the cell in which the source point is located.

In step 408, a minimum rate of inclusion is set using the client interface and/or the video interface described further in reference to FIG. 30 and is based on a predetermined minimum rate of inclusion ($r_t$) or a calculated minimum rate of inclusion using $r_t$=dn/dA where (dn) is the change in enumerated data points and dA is the change in area of the investigation window created in step 406.

In step 410, the method 400 determines if the data frequency of the data points in the investigation window created in step 406, which represents a rate of inclusion, is greater than the minimum rate of inclusion set in step 408. If the rate of inclusion is not greater than the minimum rate of inclusion, then the method 400 proceeds to step 414. Otherwise, the method 400 proceeds to step 412 to expand the investigation window.

Figure 28:
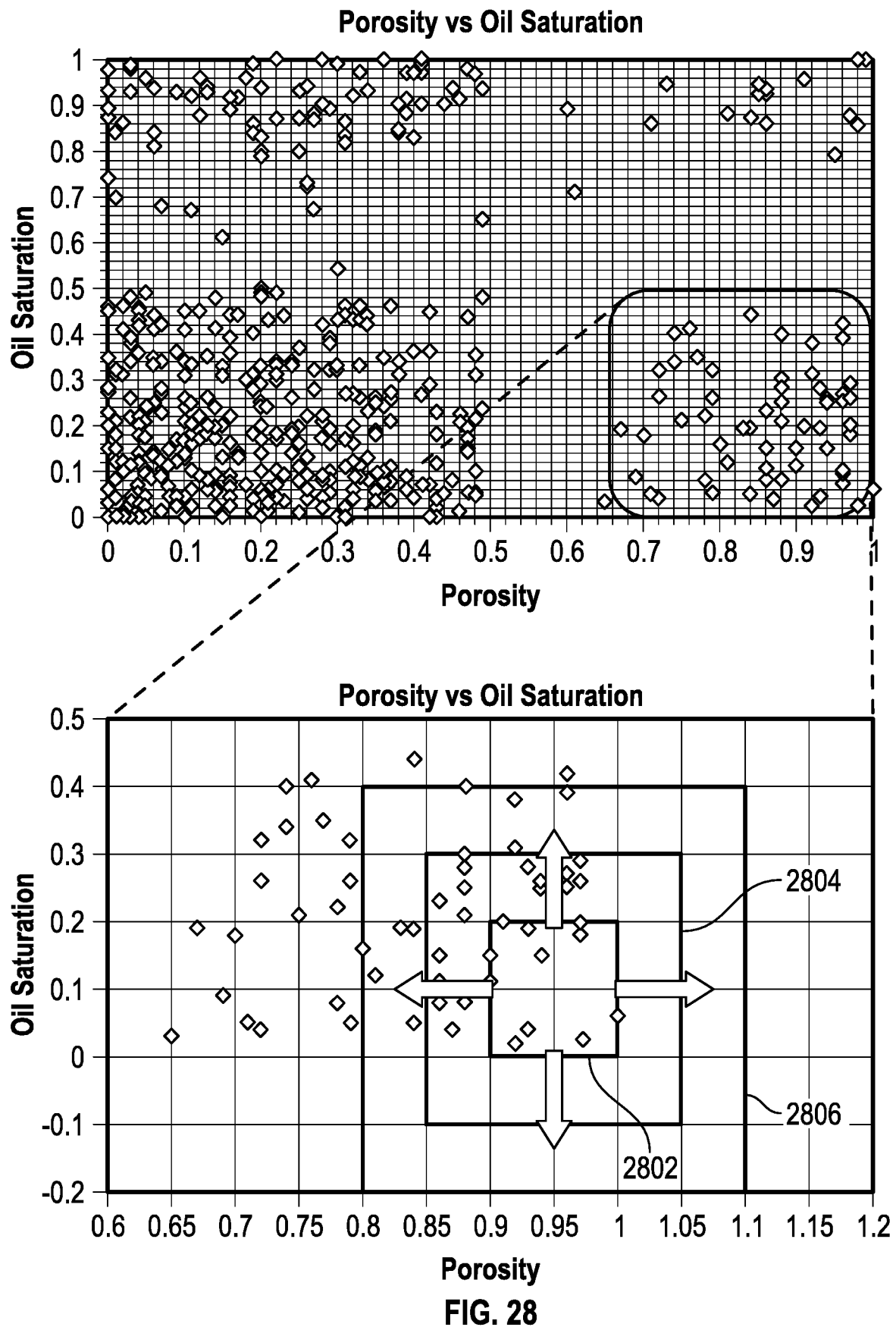
FIG. 28 illustrates the expansion of the investigation window in FIG. 27 as a result of step 412 in FIG. 4.x

In step 412, the investigation window created in step 406 is expanded by 2*dx on each side and the method 400 returns to step 410. The expansion of the investigation window in FIG. 27 is illustrated in FIG. 28 by the arrows showing the investigation window expanding from an area of 16*$dx^2$ (2802), 64*$dx^2$ (2804), 144*$dx^2$ (2806), and so forth for the shaded area in the cross-plot.

In step 414, the method 400 determines if the investigation window created in step 406 intersects the one or more partitions in the cross-plot from step 106. If the investigation window does not intersect the one or more partitions in the cross-plot, then the method 400 returns the one or more partitions in the cross-plot to step 114 in FIG. 1. Otherwise, the method 400 proceeds to step 416 to refine the one or more partitions in the cross-plot.

Figure 29:
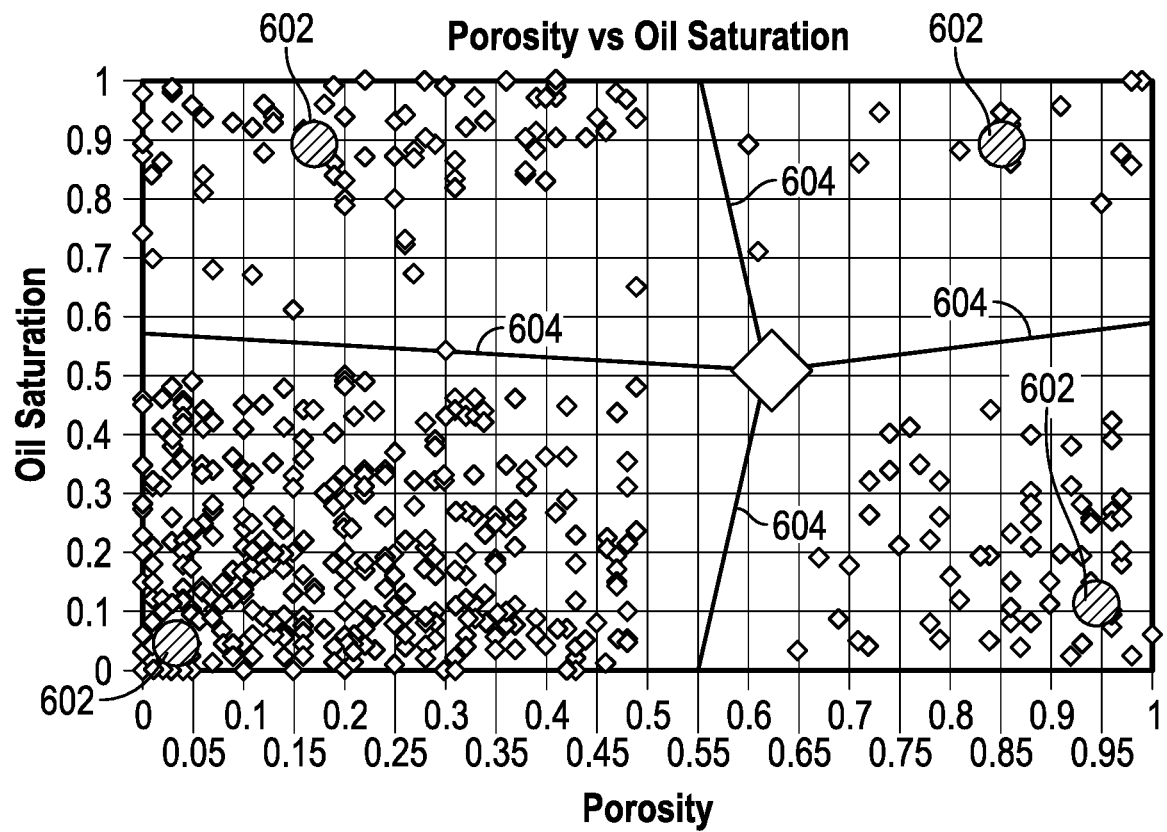
FIG. 29 is an exemplary repartitioned cross-plot illustrating one or more refined partitions from the cross-plot in FIG. 6 as a result of step 116 in FIG. 4.

In step 416, each partition in the cross-plot from step 106 that intersects the investigation window created in step 406 is refined by reorienting each intersecting partition to be tangent to a side of the investigation window that it intersects. The method 400 then returns the one or more original and refined partitions in the cross-plot to step 114 in FIG. 1. In FIG. 29, for example, each partition in the cross-plot from step 106 illustrated in FIG. 6 that intersects the investigation window created in step 406 is refined by reorienting each intersecting partition to be tangent to a side of the investigation window that it intersects once the investigation window is expanded.

System Description

The present disclosure may be implemented through a computer-executable program of instructions, such as program modules, generally referred to as software applications or application programs executed by a computer. The software may include, for example, routines, programs, objects, components, data structures, etc., that perform particular tasks or implement particular abstract data types. The software forms an interface to allow a computer to react according to a source of input. DecisionSpace® Geosciences and Nexus Desktop™, which are commercial software applications marketed by Landmark Graphics Corporation, may be used as interface applications to implement the present disclosure. The software may also cooperate with other code segments to initiate a variety of tasks in response to data received in conjunction with the source of the received data. Other code segments may provide optimization components including, but not limited to, neural networks, earth modeling, history-matching, optimization, visualization, data management, reservoir simulation and economics. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 30, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-29. The memory therefore, includes a petrofacies partitioning module, which enables steps 101-114 in FIG. 1. The petrofacies partitioning module may integrate functionality from the remaining application programs illustrated in FIG. 30. In particular, DecisionSpace® Geosciences may be used as an interface application to create the fluid property arrays used in step 101 of FIG. 1 and Nexus Desktop™ may be used to perform step 116 as well as validate output from steps 106, 110 and 112 in FIG. 1. Although DecisionSpace® Geosciences and Nexus Desktop™ may be used as interface applications, other interface applications may be used, instead, or the petrofacies partitioning module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/nonvolatile computer storage media or they may be implemented in the computing unit through an application program interface ("API") or cloud computing, which may reside on a separate computing unit connected through a computer system or network. For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, voice recognition or gesture recognition, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

What is claimed:

1. A method for predicting hydrocarbon production from a subsurface reservoir by determining non-linear petrofacies, which comprises:
    partitioning a cross-plot using a data frequency of data points of properties related to petrofacies in the subsurface reservoir in the cross-plot and a computer processor;
    repartitioning the cross-plot by one of refining one or more partitions in the cross-plot using a data frequency of data points in an investigation window in the cross-plot and modifying the one or more partitions in the cross-plot using a sensitivity analysis of data points in a first predefined region to grow and a second predefined region to reduce to generate a repartitioned cross-plot with a grown first predefined region and a reduced second predefined region defined by the one or more partitions either or both refined and modified as part of repartitioning the cross-plot; and
    identifying the non-linear petrofacies of the subsurface reservoir by analyzing the repartitioned cross-plot across a plurality of regions in the repartitioned cross-plot.

2. The method of claim 1, further comprising:
    determining a data frequency minima and location within a $Y\pm\Delta Y$ range and a $X\pm\Delta X$ range of the cross-plot;
    computing one or more partitions within the cross-plot using the data frequency minima and each respective location;
    determining a data-frequency maxima and location within a $Y\pm\Delta Y$ range and a $X\pm\Delta X$ range of each region in the cross-plot formed by the one or more computed partitions;
    locating a source term for each region in the cross-plot using the data frequency maxima and each respective location; and
    partitioning the cross-plot using the source term for each respective region in the cross-plot.

3. The method of claim 1, further comprising:
    creating an inscribed matrix in the cross-plot based on defined matrix cell dimensions for the cross-plot;
    determining a data frequency of data points in each cell of the inscribed matrix in the cross-plot;
    connecting each inscribed matrix cell with a data frequency that meets a defined petrofacies partition criteria to a contiguous inscribed matrix cell with a data frequency that meets the petrofacies partition criteria;
    defining each petrofacies region and each petrofacies partition formed by the connected inscribed matrix cells using a unique name and index identifier; and
    projecting each defined petrofacies region and each defined petrofacies partition from the inscribed matrix onto the cross-plot using each respective name and index identifier as part of partitioning the cross-plot using the data frequency of the data points in the cross-plot.

4. The method of claim 3, further comprising:
    connecting isolated cells in the inscribed matrix with a petrofacies partition comprising the connected inscribed matrix cells by enforcing a connected cell condition value.

5. The method of claim 3, further comprising:
    adding isolated cells in the inscribed matrix to cells forming a petrofacies region by enforcing a connected cell condition value.

6. The method of claim 2, wherein the investigation window is created in the cross-plot using a source term for a selected region in the cross-plot as a center and predetermined dimensions.

7. The method of claim 1, further comprising refining each partition in the cross-plot that intersects the investigation window by reorienting each intersecting partition to be tangent to a side of the investigation window that the intersecting partition intersects.

8. The method of claim 1, further comprising:
    measuring a distance between each data point in the region to reduce and a common partition between the region to reduce and the region to grow; and
    normalizing each distance.

9. The method of claim 8, further comprising assigning a predetermined threshold normalized distance to each normalized distance that does not meet the predetermined threshold normalized distance.

10. A non-transitory program carrier device tangibly carrying computer-executable instructions for predicting hydrocarbon production from a subsurface reservoir by determining non-linear petrofacies, the instructions, when executed, implement:
    partitioning a cross-plot using a data frequency of data points of properties related to petrofacies in the subsurface reservoir in the cross-plot;
    repartitioning the cross-plot by one of refining one or more partitions in the cross-plot using a data frequency of data points in an investigation window in the cross-plot and modifying the one or more partitions in the cross-plot using a sensitivity analysis of data points in a first predefined region to grow and a second predefined region to reduce to generate a repartitioned cross-plot with a grown first predefined region and a reduced second predefined region defined by the one or more partitions either or both refined and modified as part of repartitioning the cross-plot; and
    identifying the non-linear petrofacies of the subsurface reservoir by analyzing the repartitioned cross-plot across a plurality of regions in the repartitioned cross-plot.

11. The program carrier device of claim 10, further comprising:
    determining a data frequency minima and location within a $Y\pm\Delta Y$ range and a $X\pm\Delta X$ range of the cross-plot;
    computing one or more partitions within the cross-plot using the data frequency minima and each respective location;
    determining a data-frequency maxima and location within a $Y\pm\Delta Y$ range and a $X\pm\Delta X$ range of each region in the cross-plot formed by the one or more computed partitions;
    locating a source term for each region in the cross-plot using the data frequency maxima and each respective location; and partitioning the cross-plot using the source term for each respective region in the cross-plot.

12. The program carrier device of claim 10, further comprising:
creating an inscribed matrix in the cross-plot based on defined matrix cell dimensions for the cross-plot;
determining a data frequency of data points in each cell of the inscribed matrix in the cross-plot;
connecting each inscribed matrix cell with a data frequency that meets a defined petrofacies partition criteria to a contiguous inscribed matrix cell with a data frequency that meets the petrofacies partition criteria;
defining each petrofacies region and each petrofacies partition formed by the connected inscribed matrix cells using a unique name and index identifier; and
projecting each defined petrofacies region and each defined petrofacies partition from the inscribed matrix onto the cross-plot using each respective name and index identifier as part of partitioning the cross-plot using the data frequency of the data points in the cross-plot.

13. The program carrier device of claim 12, further comprising:
connecting isolated cells in the inscribed matrix with a petrofacies partition comprising the connected inscribed matrix cells by enforcing a connected cell condition value.

14. The program carrier device of claim 12, further comprising:
adding isolated cells in the inscribed matrix to cells forming a petrofacies region by enforcing a connected cell condition value.

15. The program carrier device of claim 11 wherein the investigation window is created in the cross-plot using a source term for a selected region in the cross-plot as a center and predetermined dimensions.

16. The program carrier device of claim 10, further comprising refining each partition in the cross-plot that intersects the investigation window by reorienting each intersecting partition to be tangent to a side of the investigation window that the intersecting partition intersects.

17. The program carrier device of claim 10, further comprising:
measuring a distance between each data point in the region to reduce and a common partition between the region to reduce and the region to grow; and
normalizing each distance.

18. The program carrier of claim 17, further comprising assigning a predetermined threshold normalized distance to each normalized distance that does not meet the predetermined threshold normalized distance.

19. A non-transitory program carrier device tangibly carrying computer-executable instructions for predicting hydrocarbon production from a subsurface reservoir by determining non-linear petrofacies, the instructions, when executed, implement:
partitioning a cross-plot using a data frequency of data points of properties related to petrofacies in the subsurface reservoir in the cross-plot;
repartitioning the cross-plot by modifying one or more partitions in the cross-plot using a sensitivity analysis of data points in a first predefined region to grow and a second predefined region to reduce to generate a repartitioned cross-plot with a grown first predefined region and a reduced second predefined region defined by the one or more partitions either or both refined and modified as part of repartitioning the cross-plot;
measuring and normalizing a distance between each data point in the second predefined region to reduce the region and a common partition forming at least part of the region to reduce as part of generating the repartitioned cross-plot; and
identifying the non-linear petrofacies of the subsurface reservoir by analyzing the repartitioned cross-plot across a plurality of regions.

20. The program carrier of claim 19, further comprising assigning a predetermined threshold normalized distance to each normalized distance that does not meet the predetermined threshold normalized distance.

* * * * *